(12) United States Patent
Young et al.

(10) Patent No.: US 9,244,473 B2
(45) Date of Patent: Jan. 26, 2016

(54) CURRENT RAMPING DURING MULTIPHASE CURRENT REGULATION

(71) Applicant: INTERSIL AMERICAS LLC, Milpitas, CA (US)

(72) Inventors: Chris M. Young, Austin, TX (US); Sunder S. Kidambi, Austin, TX (US); James R. Toker, Cambridge, MA (US)

(73) Assignee: Intersil Americas LLC, Milpitas, CA (US)

( * ) Notice: Subject to any disclaimer, the term of this patent is extended or adjusted under 35 U.S.C. 154(b) by 207 days.

(21) Appl. No.: 14/144,785

(22) Filed: Dec. 31, 2013

(65) Prior Publication Data

US 2014/0333270 A1 Nov. 13, 2014

Related U.S. Application Data

(60) Provisional application No. 61/820,821, filed on May 8, 2013.

(51) Int. Cl.
*H02M 3/156* (2006.01)
*G05F 1/12* (2006.01)

(52) U.S. Cl.
CPC .......................................... *G05F 1/12* (2013.01)

(58) Field of Classification Search
CPC . H02M 3/156; H02M 3/1584; H02M 3/1588; G01R 19/0084; G01R 19/62; G05F 1/56; G05F 1/575; H02J 1/102
USPC .................. 323/234, 271–275, 282, 284, 285
See application file for complete search history.

(56) References Cited

U.S. PATENT DOCUMENTS

| | | |
|---|---|---|
| 6,137,274 A | 10/2000 | Rajagopalan |
| 6,262,901 B1 | 7/2001 | Simopoulos |
| 6,271,650 B1 | 8/2001 | Massie |
| 6,515,460 B1 | 2/2003 | Farrenkopf |
| 6,534,960 B1 | 3/2003 | Wells |
| 6,803,750 B2 | 10/2004 | Zhang |
| 7,023,672 B2 | 4/2006 | Goodfellow |
| 7,107,468 B2 | 9/2006 | Pullen |
| 7,405,545 B2 | 7/2008 | Yang |
| 7,479,772 B2 | 1/2009 | Zane |
| 7,777,460 B2 | 8/2010 | Schuellein |
| 8,405,368 B2 | 3/2013 | Laur |
| 8,629,662 B2 | 1/2014 | Laur |

*Primary Examiner* — Adolf Berhane
*Assistant Examiner* — Yemane Mehari
(74) *Attorney, Agent, or Firm* — Meyertons Hood Kivlin Kowert & Goetzel, P.C.; Jeffrey C. Hood

(57) ABSTRACT

Voltage regulators in a current share arrangement may provide a total current to a common load, and may be simultaneously turned on to ramp up member currents. Each voltage regulator may provide a respective member current in the current share configuration. A target current value may be determined from a cycle-averaged current value of the member currents and a voltage error value of the voltage regulator, and each member current may be ramped to the target current value instead of the cycle-averaged current value when the voltage regulators are turned on, resulting in more stable and balanced current ramping. A predictive multi-phase digital controller may therefore operate according to a target current determined based on a measured or inferred inductor current and an error voltage. Pulse-width, pulse position and pulse frequency (adding or skipping pulses) may be calculated according to the operation of the predictive multi-phase digital controller.

21 Claims, 28 Drawing Sheets

CURRENT RAMPING DURING MULTIPHASE CURRENT REGULATION

PRIORITY CLAIM

This application claims benefit of priority of U.S. Provisional Patent Application Ser. No. 61/820,821 titled "Current Ramping During Multiphase Current Regulation", filed on May 8, 2013, whose inventors are Chris M. Young, Sundar Kidambi, and Jim Toker, and which is hereby incorporated by reference as though fully and completely set forth herein.

FIELD OF THE INVENTION

This invention relates to regulating current, and more particularly to multiphase current regulation.

Figure 1:
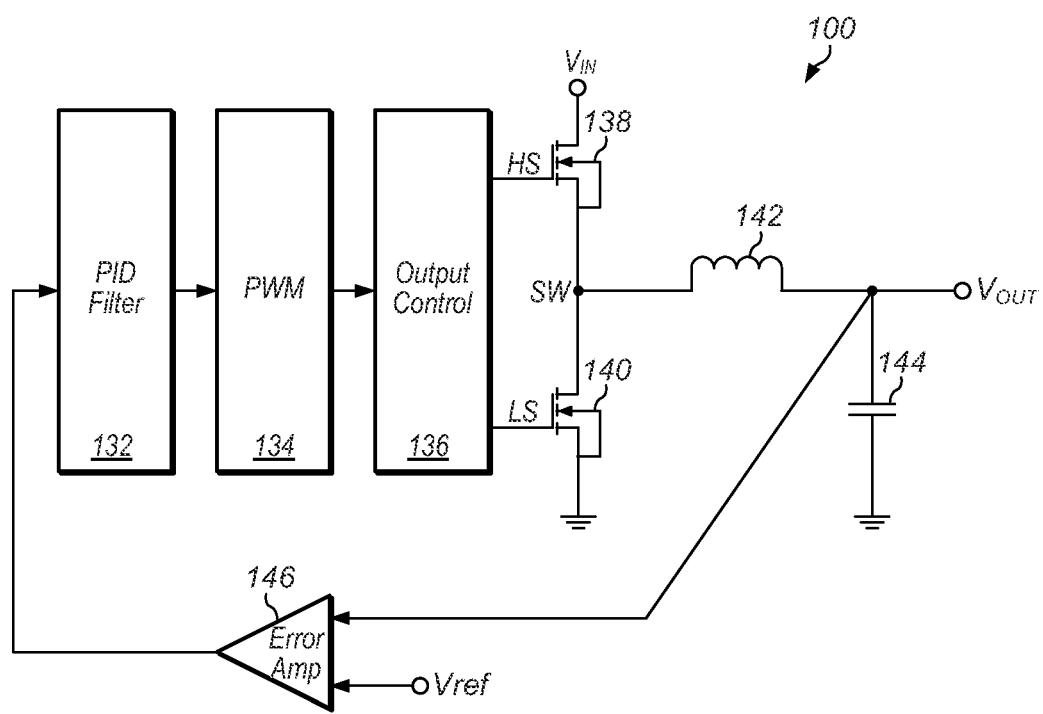
FIG. 1 shows the circuit diagram of one embodiment of a power converter also known as a buck-converter, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

DC-to-DC voltage conversion is often performed by switching voltage regulators, or step-down regulators, also referred to as voltage converters or point-of-load (POL) regulators/converters, converting a higher voltage (e.g. 12V) to a lower value as required by one or more load devices. More generally, voltage regulators and current regulators are commonly referred to as power converters, and as used herein, the term power converter is meant to encompass all such devices. A common architecture features distribution of the higher voltage to multiple voltage regulators, each producing a different (or possibly the same) voltage to one or more loads. Switching voltage regulators often use two or more power transistors to convert energy at one voltage to another voltage. One common example of such a voltage regulator 100, commonly called a "Buck Regulator" is shown in FIG. 1. Buck Regulator 100 typically switches a pair of power transistors (138 and 140) in order to produce a square-wave at the transistors' common node SW. The produced square-wave can be smoothed out using an LC circuit comprising inductor 142 and capacitor 144 to produce the desired voltage, $V_{out}$. A control loop, comprised of an Error Amplifier 146, a Proportional-Integral-Differential (PID) Filter 132, a Pulse-Width-Modulator (PWM) 134, and an Output Control circuit 136, can be configured to control the duty-cycle of the output square-wave, and hence the resulting value of $V_{out}$.

Figure 2:
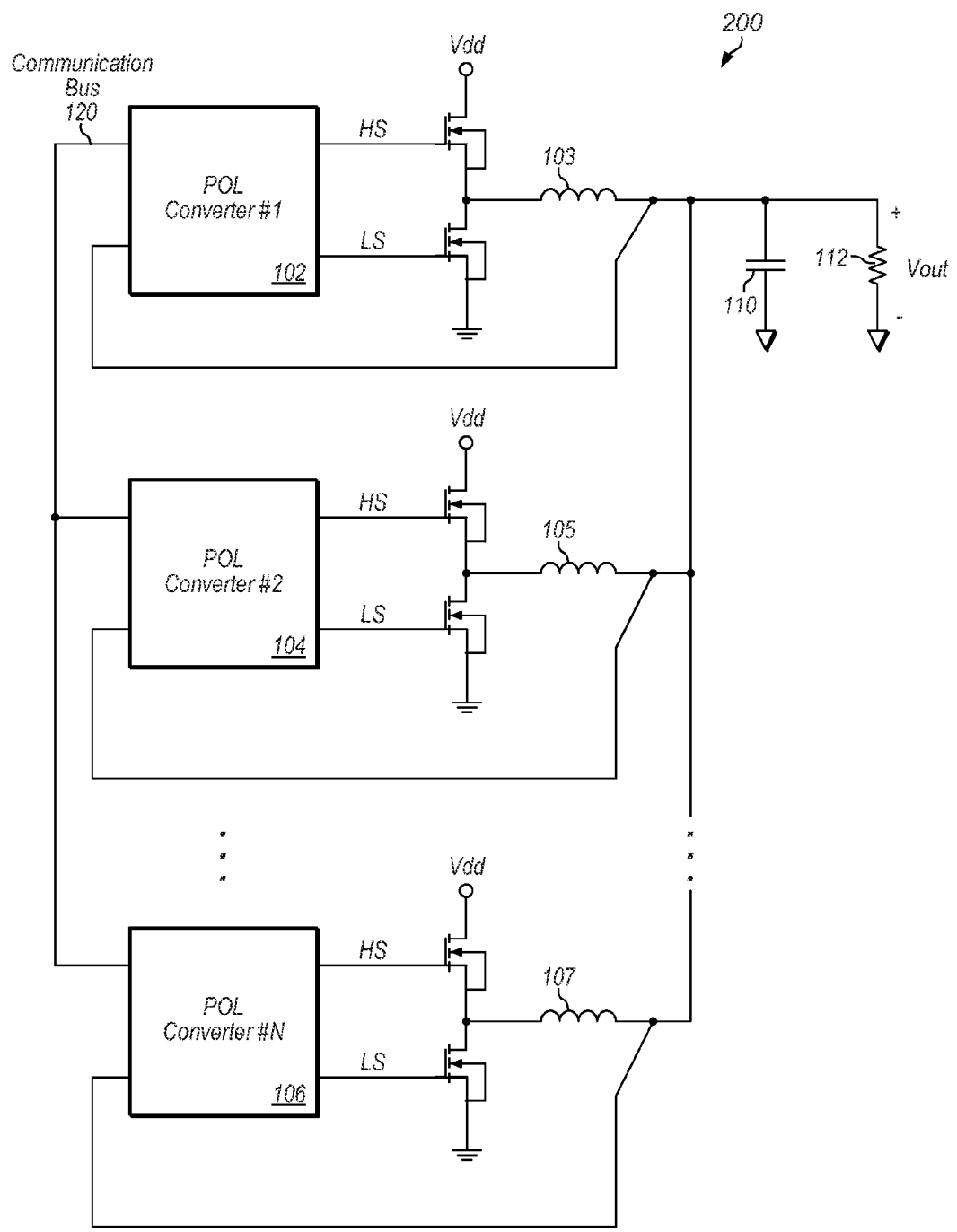
FIG. 2 shows the circuit diagram of a current share configuration with multiple voltage regulators providing current to a common node, according to prior art.

Distributed power through shared point of load supplies has a number of compelling advantages over a single point of load supply, or POL regulator. Distributed or current sharing may be used to accommodate the ever increasing current demands associated with low voltage applications through better efficiency over a wide range of output currents, reliability through redundancy, and distributed heat dissipation. One example of a current sharing configuration is shown in FIG. 2. POL converters 102, 104, and 106 (representative of a first, second, and Nth POL converter) may be coupled to a digital communication bus 120, with their respective regulated voltage outputs shared through respective inductors 103, 105, and 107, and capacitor 110, to provide a single voltage at a load represented by resistance 112. It should be noted that while in FIG. 2 the output stages (the HS FET and LS FET transistor pairs) are shown outside the respective POL converters, in FIG. 1 the output stage is indicated as being a part of the POL regulator, to best highlight certain specified features of the different embodiments. It should also be noted that while the output stage is a functional part of the POL converter, when the POL converter is configured on an integrated circuit (IC) for example, the control circuit and the output stage may or may not be configured on the same IC. Those skilled in the art will appreciate that various illustrations of the POL regulators disclosed herein are meant to embody all possible implementations in accordance with the current sharing principles set forth herein.

In one set of embodiments, a low bandwidth, multi-order digital control loop may be configured to balance the inequalities between device outputs by aligning the load lines of slave devices (POL regulators operating as slave devices on the digital communications bus) to a master device (a POL regulator operating as a master device on the digital communications bus). However, a first-order digital control loop may be sufficient. A self-determined or dedicated master POL regulator (for example POL regulator 104) may digitize its sensed output current, and transmit information indicative of the value of this current over the digital communication bus 120 to all slave POL regulators (e.g. POL regulators 102 and 106) of the group in a traditional master-slave configuration. All slave devices may adjust the duty-cycle of their respective control FETs to effectively increase or decrease their target output voltage up or down, based on the difference between the value of master device's output current and the value of the respective slave device's output current. One embodiment for the trimming of the output voltages may be accomplished by adjusting the target voltage (Vref, in regulator 150) in the front-end error amplifier (amplifier 146, in regulator 150). Other embodiments for the trimming of the output voltages may be accomplished by scaling the duty-cycle either by correcting the taps in the control filter (132, in regulator 150), or by adjusting the control number to the duty-cycle control block (134, in regulator 150). The master device may actively transmit the information indicating the value of its current over a communication bus, such as, I2C, SMBus or some other communication bus (120, in the configuration of FIG. 2), while the slave devices may use that information to trim their programmed reference voltage to balance the current loading of each device in the system. The master device may continue to transmit the information until a fault occurs, its phase is dropped or its communication interface fails, at which point the other slave devices in the group may arbitrate the new master. The member currents (i.e. the individual currents of the POL regulators in the current sharing group) may thereby be balanced to, for example, within 5% of the averaged member load current with a 16 Hz update bandwidth.

Voltage regulators, such as voltage regulator 100 shown in FIG. 1, and regulators 102, 104, 106 shown in FIG. 2, for example, usually include a mechanism for recovering from transient output voltage deviations. These short-term voltage deviations may be caused by a variety of control loop disturbances, such as target reference voltage changes, input bus voltage steps, load current transients, and other events that may cause the output voltage to deviate from its intended nominal value. Typically, signal-processing circuitry in the control loop of the voltage regulator (including output control 136) processes these voltage deviations. The recovery process implemented by the control loop is relatively slow, however. Overall, the factors most often considered in the design of reliable voltage regulators include transient response, stability of the output over a wide range, ease of use, and cost. These are also considerations in current sharing arrangements, such as the one illustrated in FIG. 2.

In order to obtain specifically desired system performance, it is therefore also necessary to compensate the voltage regulator (or, more generally a power converter or a system with at least one controlled output) to recover from transient output voltage deviations. Compensation, however, is oftentimes difficult to implement. Many applications require a transient response along with a high bandwidth response. For example, conventional regulators that use voltage-mode control, e.g. voltage-mode PWM control (e.g. as shown in FIG. 1) typically require compensation. Current-mode control mechanisms require less compensation, but require compensation nonetheless. In addition, current-mode control can easily make the system more sensitive to noise that is oftentimes introduced during the current measurement process. While hysteretic control modes require very little or no compensation, they require stabilization of the switching frequency, since stable frequency is typically an important requirement in certain applications, for example in telecommunications applications. Furthermore, hysteretic control is difficult to synchronize in multiphase applications.

In one set of embodiments, a voltage regulator may be operated at a constant switching frequency, and may have a fast transient response without requiring current measurement for regulation (inferring the inductor current instead, based at least on an established steady state behavior of the output of the voltage regulator, though alternate embodiments may include current measurement instead of inferring the inductor current, as preferred), and without requiring compensation. One approach to compensation-free power supplies is one-cycle (or single-cycle) control. In some embodiments, a digital modulator implemented in each POL regulator in system 200 may operate at a fixed frequency and with high bandwidth, to potentially achieve a good transient response for the individual POL regulators. The modulator may also be designed to operate compensation free. While such a single-cycle control may work well for single POL regulators, inherent latency in digital control may be an issue when operating the POL regulators in a current sharing configuration such as system 200 shown in FIG. 2. More specifically, the digital latency and fixed frequency may limit the transient response, while a need remains to handle dynamic current balance during a high repetition rate transient event. The aforementioned digital modulator may operate as a Single Cycle Regulator (ASCR), which may correct voltage deviations in a single switching cycle. The switching cycle may have a fixed period (constant switching frequency), which is advantageous for telecom applications, and may be inherently stable, allowing for ease of use. ASCR may also eliminate the need to perform fast current measurements, which may incur noise and the expense of analog-to-digital converters (ADC) required to produce the numeric measurement values for digital processing.

Figure 3:
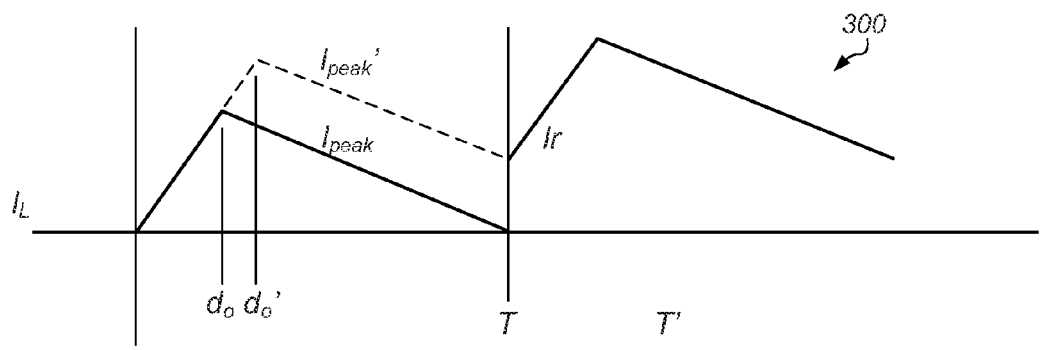
FIG. 3 shows the relationship between duty-cycle value and the inductor current when the current is corrected in a single cycle according to prior art methods.

Therefore, it is desirable to achieve high bandwidth control, which may be aided by inherent stability and ripple filtering. It may also be desirable to implement dual edge modulation to avoid having to wait for the next cycle to correct for the present cycle, thereby also effectively doubling the "sampling" rate. The gain is determined to be sufficient to correct for a transient in a single cycle, with the response limited by the inductor/capacitor filter rather than the controller. One example of a single-cycle approach is illustrated in FIG. 3 via current diagram 300 showing the behaviour of the load current $I_L$, indicating unsatisfactory results. As shown in FIG. 3, the duty-cycle may be adjusted ($d_o$ represents the steady-state duty-cycle, while $d_o'$ represents the adjusted duty-cycle) to deliver the charge/current to restore the voltage in one cycle. This approach, however, may not work because the current as the cycle is exited (after time T, at time T') does not match the required value of the current (for the capacitive case) to maintain the desired value of the output voltage. As seen in FIG. 3, the current overshoots, leading to overshooting the output voltage as a result of the charge introduced during the single correction cycle, due to the duty-cycle adjustment that was necessary for adjusting the output voltage.

Figure 4:
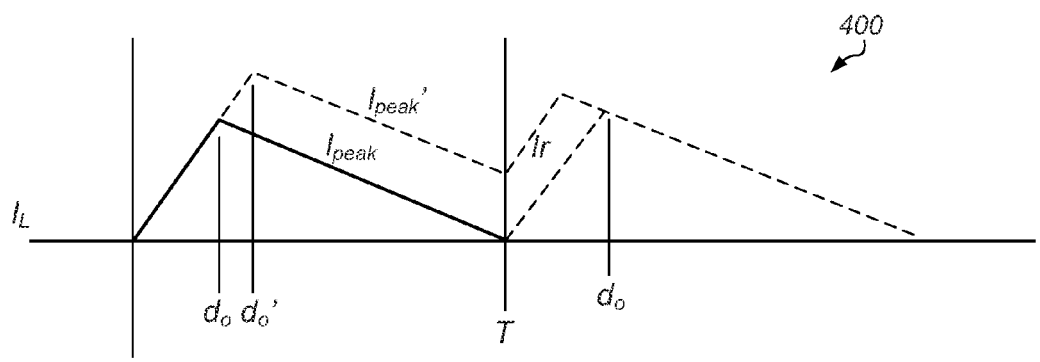
FIG. 4 shows the relationship between duty-cycle value and the inductor current when the current is corrected in a single cycle according to one embodiment.
Figure 5:
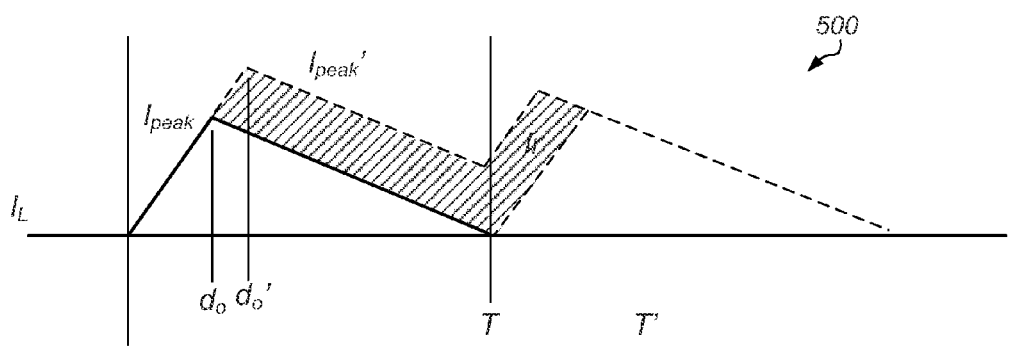
FIG. 5 shows the relationship between duty-cycle value and the inductor current and the electrical charge at the power converter output when the current is corrected in a single cycle according to one embodiment.
Figure 6:
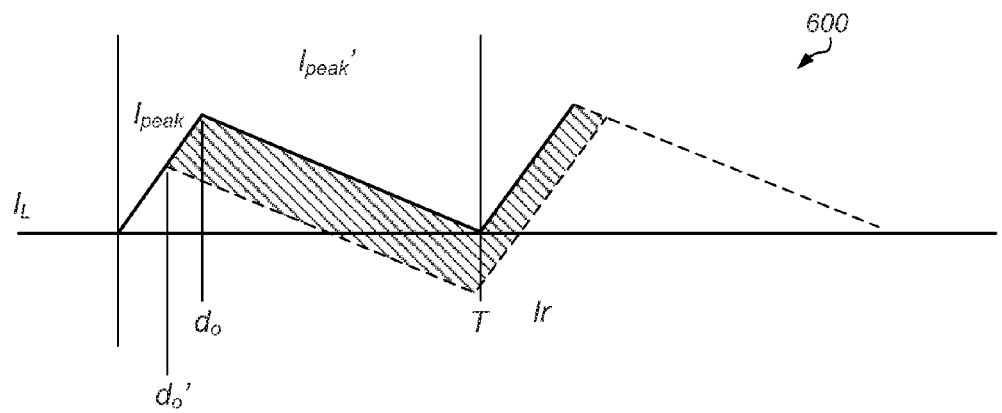
FIG. 6 shows the relationship between duty-cycle value and the inductor current and the electrical charge at the power converter output when the current is corrected in a single cycle according to another embodiment.

A different, improved approach may include adjusting a charge at the output of voltage regulator in response to a transient deviation of the output voltage while restoring the output voltage. The charge may be adjusted during the cycle subsequent to the (preceding) cycle during which a response of the voltage regulator to the transient deviation was corrected. The charge may be adjusted according to a control value derived from the respective values to which the steady-state duty-cycle is/was set during the present cycle/preceding cycle, and from a value representative of an adjustment made to the steady-state duty-cycle value to decrease response time of the voltage regulator when correcting the output voltage in response to the transient deviation on of the output voltage. In other words, the average inductor current may track the load current, and the change in inductor current needed for the adjustment to the output voltage may be reversed. The potential result of this approach is illustrated via current diagram 400 in FIG. 4. Examples of the effects of charge regulation on the output current are shown in FIGS. 5 and 6. The shaded areas represent the added electrical charge at the output (specifically, on the output capacitor) resulting from the duty-cycle adjustment aimed at adjusting the output voltage in response to a transient event, during a single correction cycle. As seen in FIGS. 5 and 6, the load current does not overshoot, in fact it doesn't change except during the single cycle during which the duty-cycle adjustment is made. As also shown in FIGS. 5 and 6, $d_o$ again represents the steady-state duty-cycle, while $d_o'$ represents the adjusted duty-cycle.

In this context, "instability" may be considered as a "phenomena" that carries over from one switching cycle to another that eventually builds to a point of undesirable consequence. Accordingly, a key to stability may be to isolate the "phenomena" to a single switching cycle so that the undesirable consequences are not allowed to propagate and build from one cycle to another. When a new cycle begins, the changes from the previous cycle(s) are "undone". Proportional control "within" a cycle may then restore current, resulting in charge mode control in a cycle. It should be noted, however, that with high bandwidth and high gain, filtering may be needed to prevent the modulator from trying to correct for perceived "noise". Traditional analog filters (e.g. IIR) may provide some correction, but substantial filtering leads to substantial delays, which negatively impact both bandwidth and stability. For example, when performing conventional filtering, a first order IIR filter (like a single stage analog filter) reduces the noise but introduces a delay, while higher order filters attenuate better but introduce additional delay. Furthermore, while FIR filtering can eliminate the noise (ripple), delay may still constitute a problem. Therefore, in various embodiments, a special digital filter that cancels the ripple and has minimal delay may be used, possibly leading up to a 20 dB signal-to-noise improvement (which may be considered a "gain" improvement).

When considering the various issues affecting multiphase current control, dynamic current balance represents one of the greatest challenges. Optimization studies have indicated that single phase ASCR has proven to be robust without requiring nonlinear gain. However, the challenge remains to move from single phase regulation (e.g. of a single regulator such as regulator 100 in FIG. 1) to multiple phase current sharing regulation (e.g. of multiple regulators such as regulators 102, 104, 106 shown in a current sharing configuration 200 in FIG. 2).

Current Ramping

Figure 7:
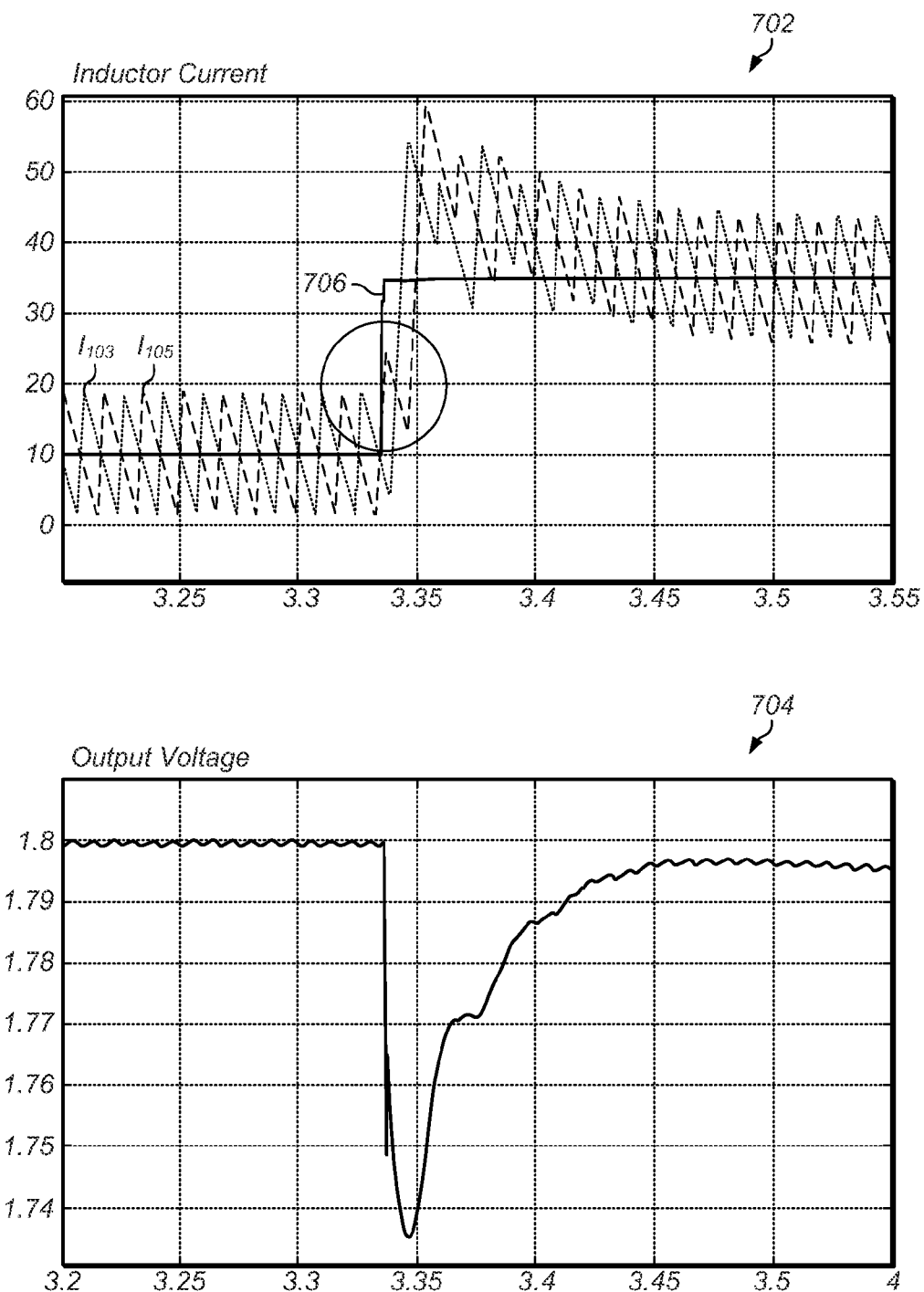
FIG. 7 shows a wave diagram illustrating the behavior of two member inductor currents in a current share configuration when ramped to a cycle-averaged value, and further shows a wave diagram illustrating the behavior of the regulator output voltage during the same time period.
Figure 8:
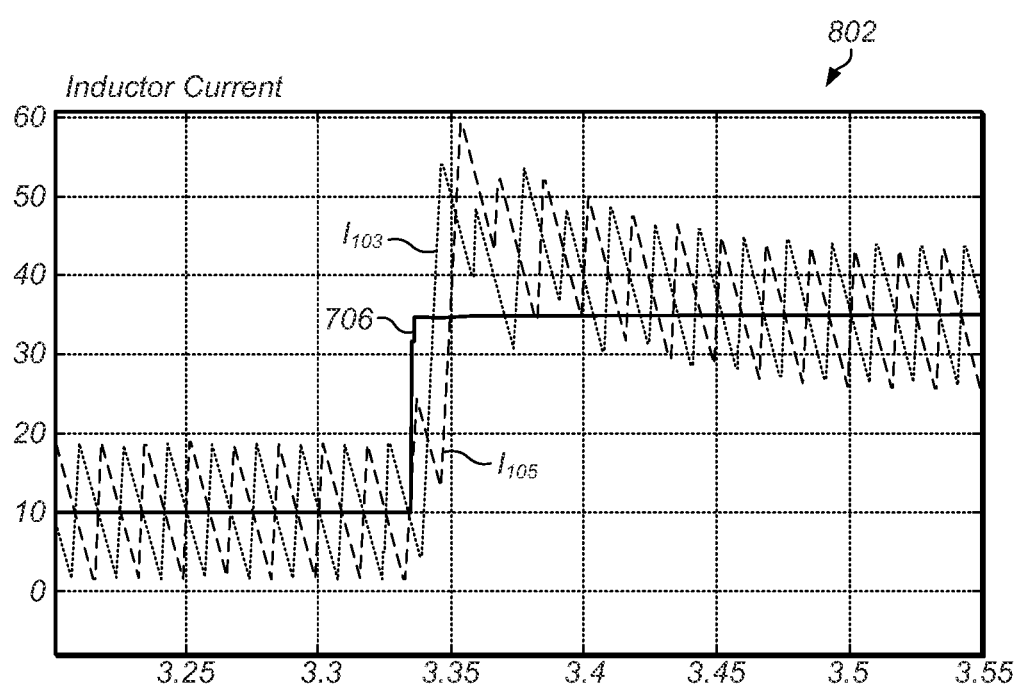
FIG. 8 shows the wave diagram illustrating the behavior of two member inductor currents from FIG. 7 in more detail.

The behaviour of a basic model according to system 200 with two phases (i.e. two POL regulators, e.g. regulators 102 and 104 only) is shown in FIG. 7, with graph 704 illustrating behavior of the output voltage $V_{OUT}$, and graph 702 illustrating the behavior of inductor currents $I_{103}$ (current conducted by inductor 103) and $I_{105}$ (current conducted by inductor 105), with the average current represented by trace 706. As seen in the upper portion of graph 702, current share is appropriate without much noise present. However, as also indicated by the circled lower portion of graph 702, current ramping is delayed, in this specific instance for current $I_{105}$, which is shown dipping back down before rising again towards the target value, which is representative of undesired behavior. Preferably, the current is expected to ramp up without considerable delay. Graph 802 in FIG. 8 shows in somewhat more detail the delayed current ramp illustrated in graph 702 of FIG. 7. Current ramping may be delayed due to PWM phasing present for $I_{103}$. While no initial delay is present for $I_{105}$, that current does "reverse" before reaching the desired value. Overall, the current share slows down the current ramp, with faster ramping currents slowed down to match the average current (trace 706). It should be noted that the traces and graphs represented in FIGS. 7 and 8 are meant to illustrate the ramping of the respective inductor currents in a current share configuration including two POL regulators, which are reference in FIG. 2 by way of example. The analysis represented in FIGS. 7 and 8 (as well as additional graphs referenced below) are meant to highlight certain operating principles that may be taken into account for providing a solution to eliminate or minimize the delay during current ramping in a current share configuration, and is not meant as a representation of the behavior of the POL regulators shown in FIG. 2, but as a representation of the behavior of the POL regulators in the absence of additional systems and methods implemented to eliminate or minimize the delay during current ramping in the POL regulators (e.g. those shown in FIG. 2). Furthermore, for the sake of simplicity only two inductor currents are shown, however the analysis equally applies to three or more POL regulators connected in a current sharing configuration.

Figure 9:
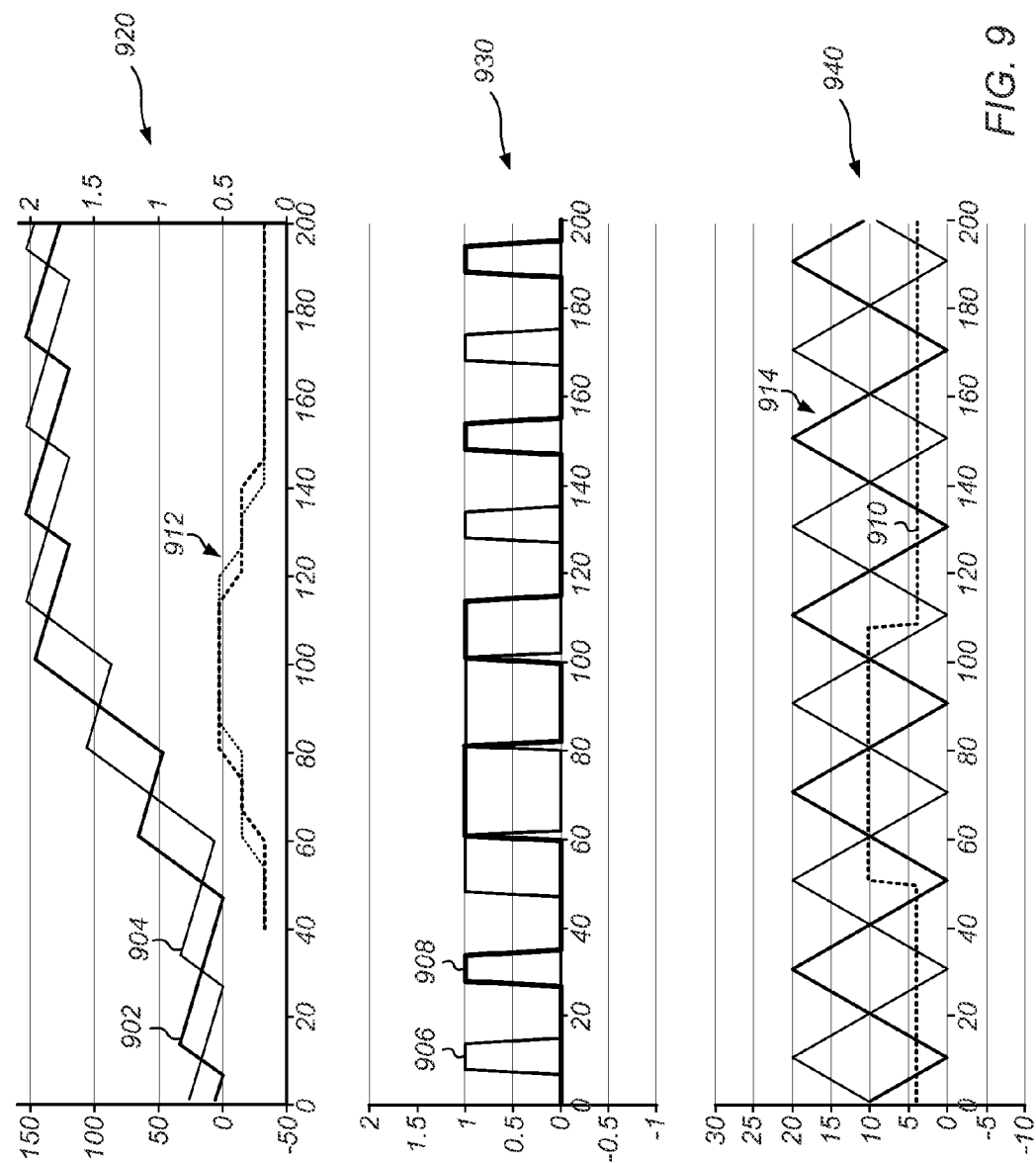
FIG. 9 shows a first set of waveforms illustrating the relationship between the behavior of two member currents, PWM driving signals, and a duty-cycle control command during ramping.

FIG. 9 shows timing diagrams for the phase (inductor) currents (920), the PWM control signals corresponding to the phase currents (930), and the duty-cycle command used for controlling/generating the PWM signals (940). As seen in FIG. 9, the current for both "Phase 1" (902) and "Phase 3" (904) falls before it reaches the commanded duty-cycle. The Duty-cycle command during this time is 50%, as indicated by the duty-cycle command signal 910, and corresponding PWM signals 906 and 908 driving the respective output stages of the regulators that produce currents 902 and 904, respectively. The traces 912 represent the moving averages of the duty-cycle of the PWM signals 906 and 908, and the triangular waveforms 914 represent the sawtooth control signal for dual edge PWM control. As also indicated in FIG. 9, it takes "Phase 3" almost ¼$^{th}$ of a cycle to respond, and it takes "Phase 1" almost a full cycle to reach the commanded duty-cycle. Note also that "Phase 1" turns off before reaching the commanded duty-cycle.

Figure 10:
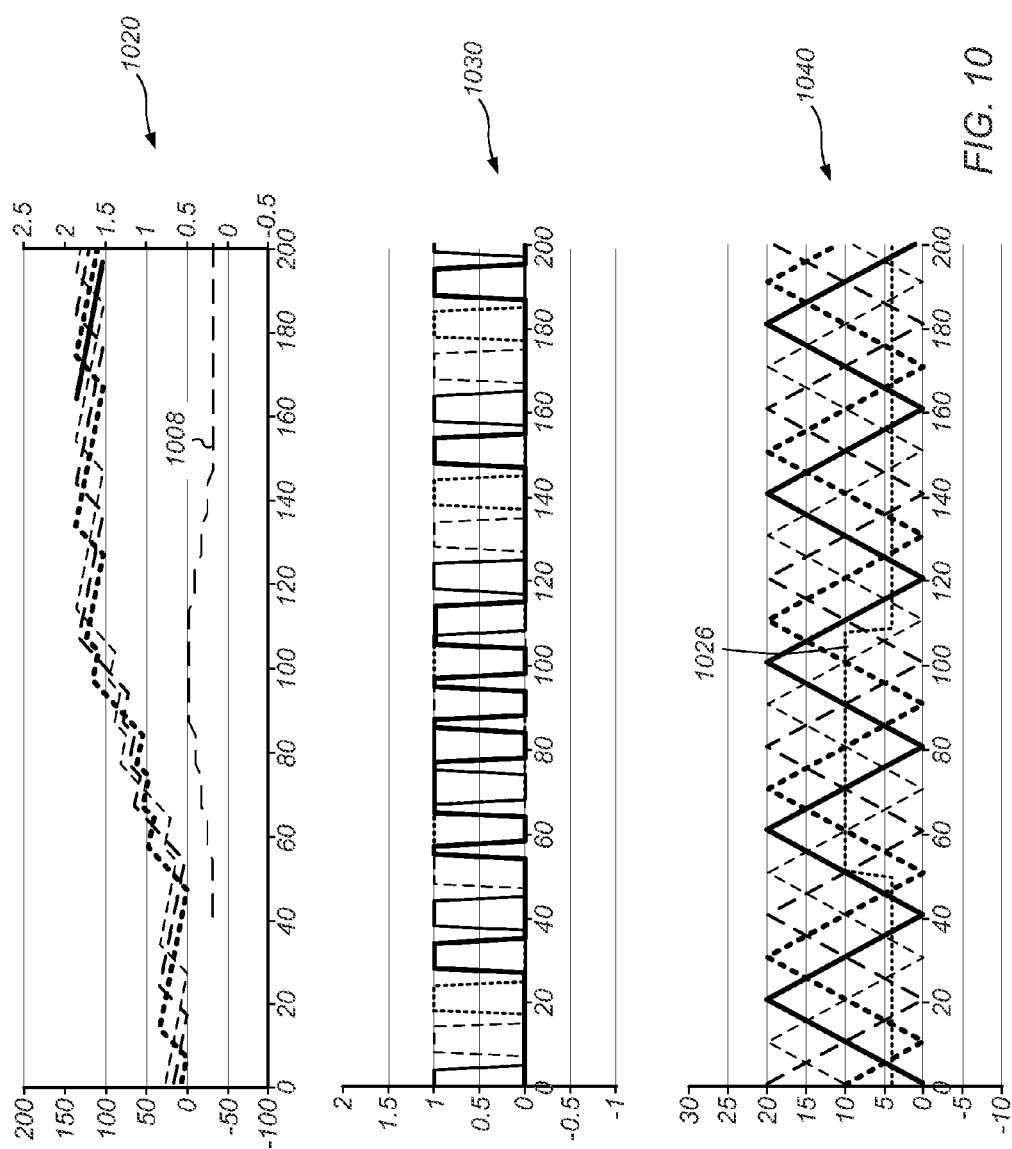
FIG. 10 shows a second set of waveforms illustrating the relationship between the behavior of multiple member currents, PWM driving signals, and a duty-cycle control command during ramping.

FIG. 10 again shows timing diagrams for the phase (inductor) currents (1020), the PWM control signals corresponding to the phase currents (1030), and the duty-cycle command used for controlling/generating the PWM signals (1040), but for four phase currents instead of only two phase currents. As seen in FIG. 10, average current sharing slows the current ramp considerably. Other phases are delayed until the phase that is "on" reaches its steady state peak. Then, all phases turn on but there is a phase that has the lowest instantaneous current. So after a short while, all of the other phases must turn off so that the lowest phase can catch up. This cycle continues, whereby all phases turn on briefly, and then the lowest phase remains on while the others turn off. Timing diagram 1040 again provides an illustration for the duty-cycle command 1026.

Figure 11:
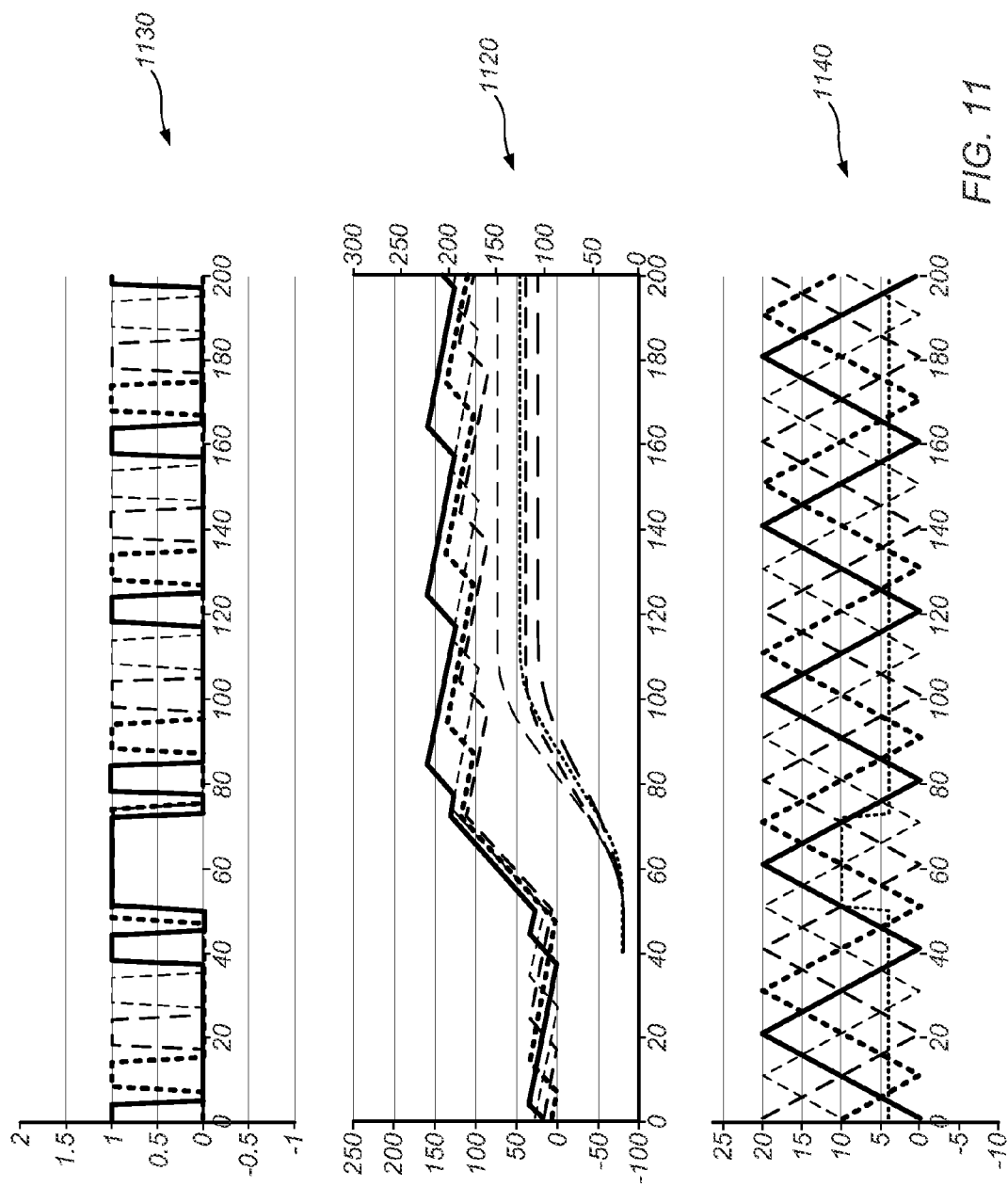
FIG. 11 shows a third set of waveforms illustrating the relationship between the behavior of multiple member currents, PWM driving signals, and a duty-cycle control command during ramping, indicating the current imbalance created when forcibly turning on all member currents simultaneously.
Figure 12:
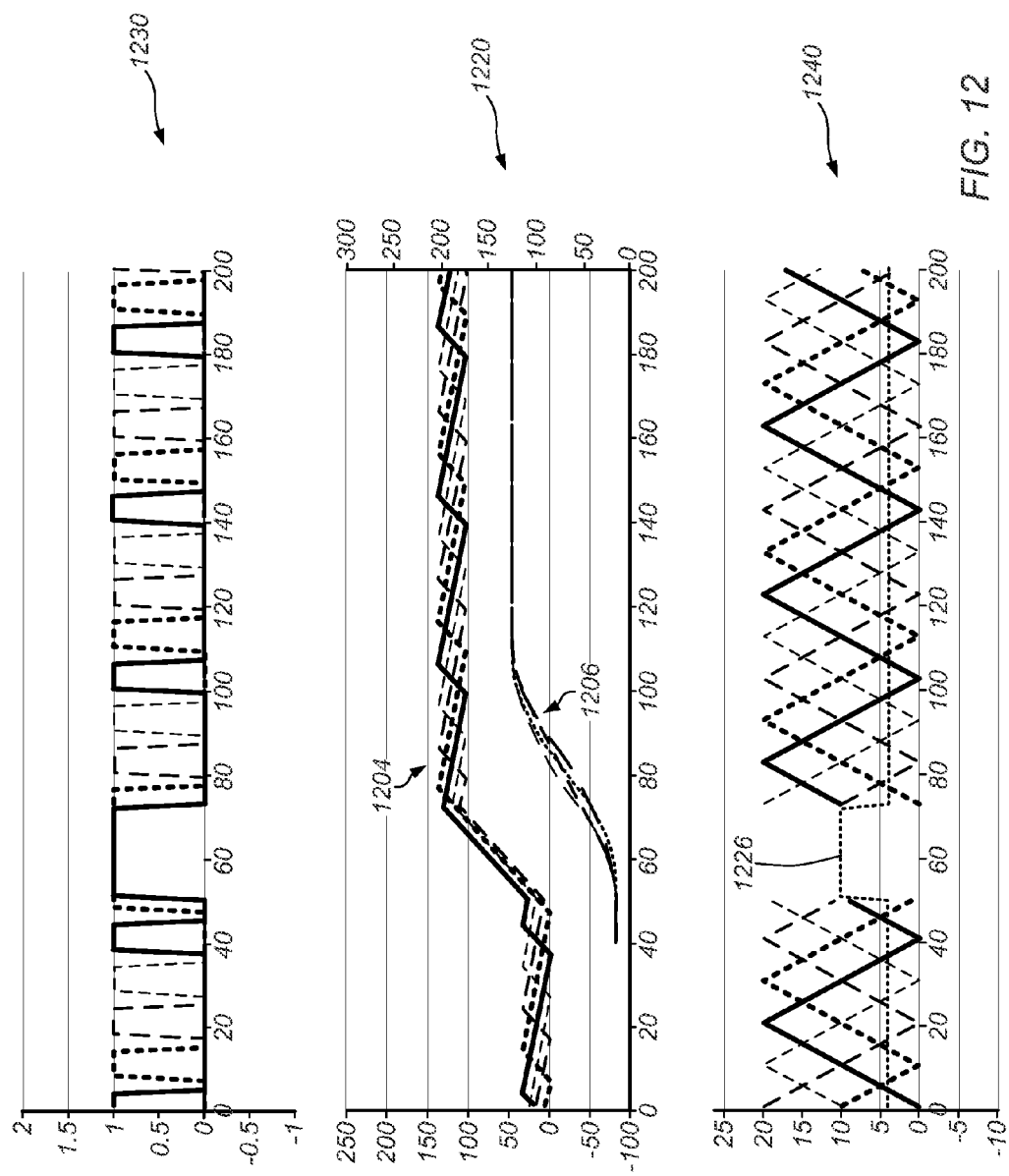
FIG. 12 shows a fourth set of waveforms illustrating the relationship between the behavior of multiple member currents, PWM driving signals, and a duty-cycle control command during ramping, indicating the effects of current lock when all currents are shifted together, whereas the PWM is operated at the steady state duty-cycle, and is "frozen" while shifting the current.

FIG. 11 illustrates how force turning on all phases may create a current imbalance. FIG. 11 again shows timing diagrams for the phase (inductor) currents (1120), the PWM control signals corresponding to the phase currents (1130), and the duty-cycle command used for controlling/generating the PWM signals (1140), for four phase currents. Graph 1120 illustrates the behavior of the emulated current based on the integrated duty-cycle difference from steady state duty-cycle. FIG. 12 shows timing diagrams for the phase (inductor) currents (1220), the PWM control signals corresponding to the phase currents (1230), and the duty-cycle command used for controlling/generating the PWM signals (1240), and illustrates the effects of current lock, whereby all currents are shifted together (up or down), else the PWM is operated at the steady state duty-cycle, and is "frozen" while shifting the current. Traces 1204 represent the various inductor currents (of the various phases), and indicates that the currents are balanced following the current ramp. Traces 1206 represent the moving averages of the currents represented by traces 1204. The duty-cycle control trace 1226 in graph 1240 illustrates how modulation is stopped at approximately time point 50, and engaged again—at the same value where modulation was previously stopped—to resume ramping, at approximately time point 70. Therefore, as illustrated in FIG. 12, current sharing is in effect disabled during the time period where modulation is stopped.

Although the current waveforms in FIG. 12 look well balanced, the emulated current indicates that the currents do not balance until about one cycle after the ramping has stopped. Thus, a current such as the emulated current shown may not be usable for balancing the currents in real time. However, if the "on" times were adjusted at this time (i.e. after the ramping has stopped) to balance the emulated currents, the current balance may be disrupted. In present day systems, typically an average value of the current is determined, and all currents are driven to the determined average value when starting a current share configuration. However, the problems described above arise when attempting to drive all the currents to the average value. Attempting to drive the currents to a maximum or minimum current value may also not fix the problem, as driving to the maximum current may work only for applying a load, while driving to minimum current may work only for releasing the load.

Predictive Current positioning

Figure 13:
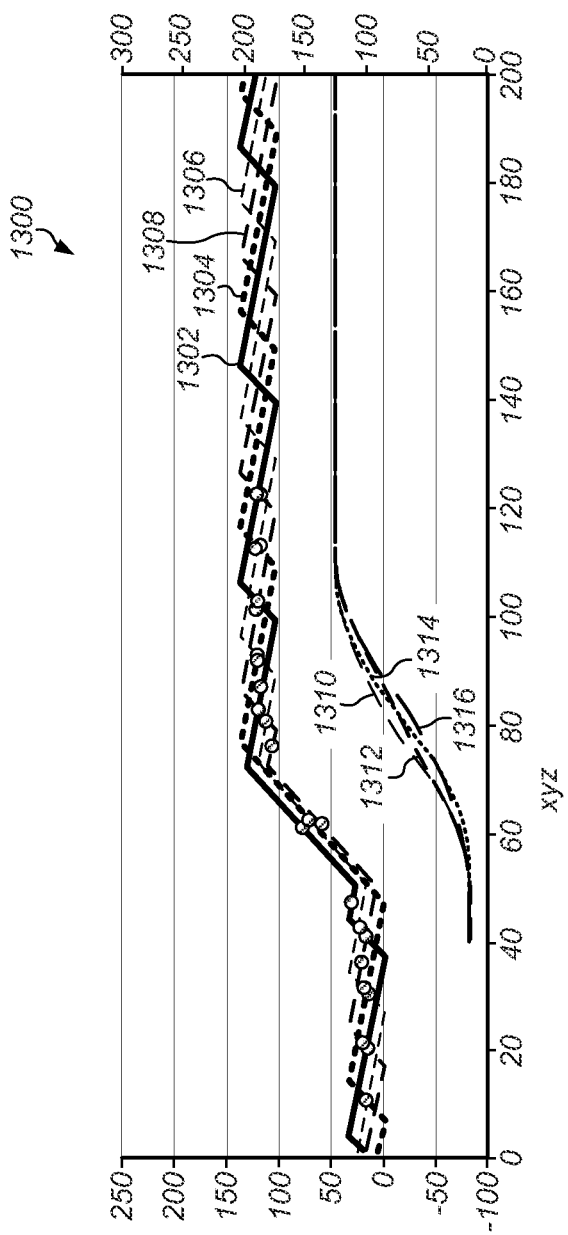
FIG. 13 shows waveforms illustrating the behavior of multiple member currents all driven to the same target current value that is different from the average current value.

In one set of embodiments, one solution to problem described above includes driving all phases, i.e. driving the respective currents in all phases to the same target current that is different from the average current value. This is illustrated in FIG. 13, which shows a waveform diagram 1300 illustrating current waveforms (traces) 1302, 1304, 1306, and 1308 for four respective phase (inductor) currents, with the respective moving averages of those currents shown by corresponding traces 1310, 1312, 1314, and 1316. Currents in all phases may be ramped as quickly as possible, and they may inherently balance in steady state, while also balancing in non-steady-state as long as the target value is the same for (the currents in) all phases. In one set of embodiments, this target current value may be determined based on a voltage error, as will be further described below. An "outer loop" (i.e. voltage regulation loop) may be used to drive the current target, i.e. drive the currents to the target value. In some embodiments, this may be achieved by using digital pulse placement for the driving pulse, that is, the pulse driving the output stage of the POL regulator (e.g. HS and LS FETs).

Figure 14:
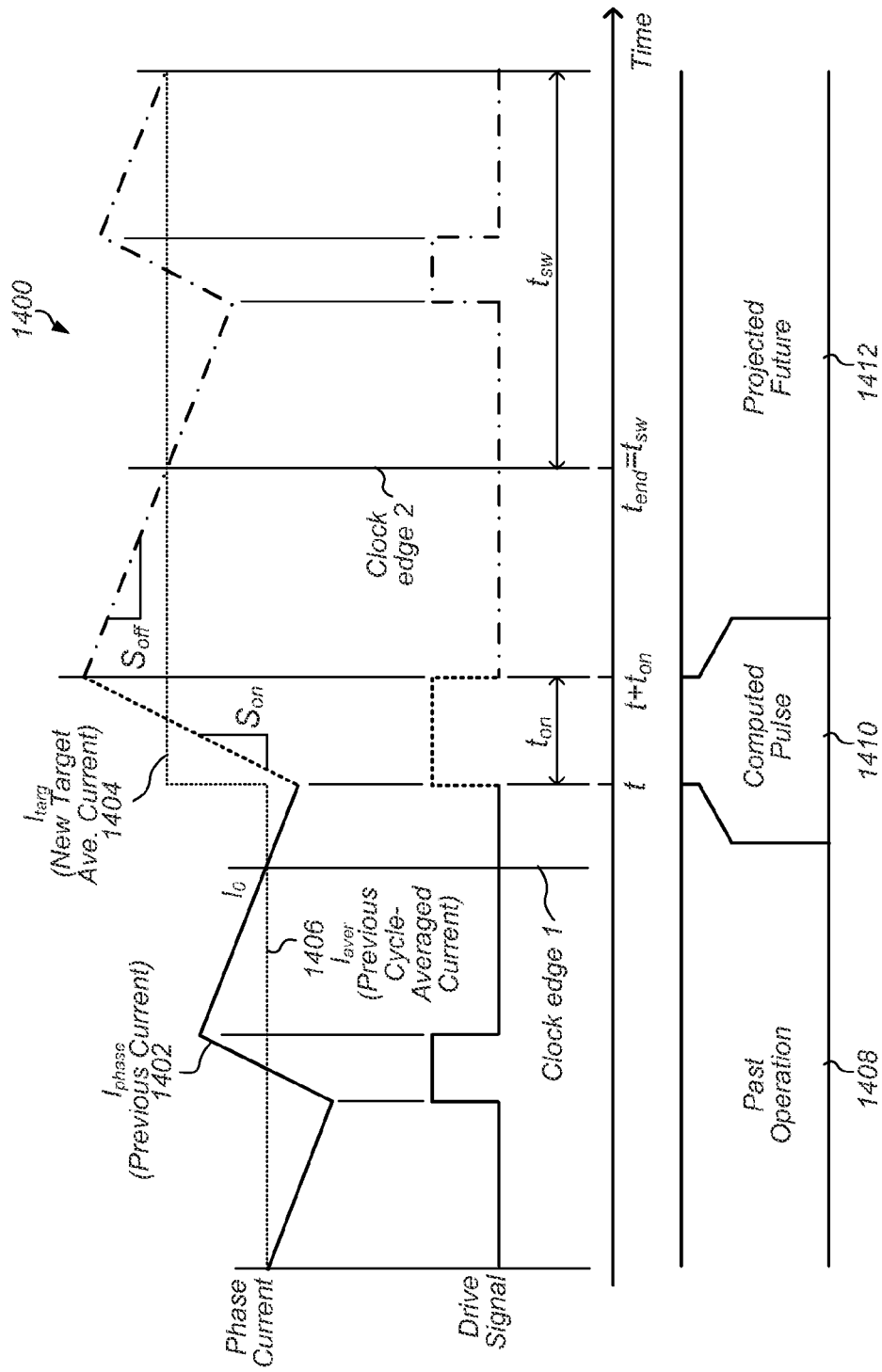
FIG. 14 shows a waveform diagram illustrating the relationship between the behavior of a phase current and its corresponding drive signal, indicating that the pulse may be placed at any position within a cycle.

As illustrated in the timing diagram 1400 of FIG. 14, using digital control, the start and stop of a pulse of the drive signal (i.e. the PWM signal driving the output stage of the regulator) may be placed at any position within a cycle. The exemplary cycle in FIG. 14 is bounded by clock edge 1 and clock edge 2 on the left and the right, respectively. The "on time" may be determined by the desired current at the end of the cycle, given the current at the beginning of the cycle. The desired current may be determined according to the error signal (e.g. the error signal output by amplifier 146 as illustrated in FIG. 1). The start time may be determined by centering the pulse in a cycle, matching the average current in a cycle to the desired current, and moving a pulse forward or backward in a cycle as a function of e.g. dV/dt. On the timeline shown in FIG. 14, up to point in time "t" represents past operation (1408), the computed pulse 1410 is indicated between t+$t_{on}$, and the projected future operation 1412 follows point in time t+$t_{on}$. $I_{phase}$ 1402 represents the phase current during past operation 1408, with the average current $I_{aver}$ 1406 corresponding to the previous cycle averaged current (of $I_{phase}$), and $I_{targ}$ 1404 representing the targeted new average current for the projected future operation 1412.

In one set of embodiments, the main features of an architecture for a digital multiphase system may include predictive emulated current positioning, which may: operate to predict the current waveform based on planned pulses to eliminate latency, have one current ADC read each phase once per Fsw (switching period), and be adapted to estimate circuit parameters (L, DCR, $R_{on}$). The features may also include a simple PID (proportional integral derivative) voltage outer loop, fixed frequency base plus pulse advance, and extra pulses on demand (with a maximum per-phase switching frequency limiter; e.g. 1.5*Fsw), and a specified internal sample rate that is a multiple of Fw (e.g. 24*Fsw to 30*Fsw). One set of simulation conditions for simulating a digital multiphase model are as follows: VR12.5 load with 6-phases, where L/DCR=150 n/300 µ, C=4*470 µ+52*14.4 µ, Fsw=600 KHz, VID=1.8V, Rdroop=1.2 m Ohms, load 10-150 A (1 A/ns).

The block diagram of one embodiment of a loop design 1500 for a controller for a POL regulator that may be used in a current sharing configuration according to the principles described above is shown in FIG. 15. The controller may include an analog section 1502 and a digital section 1504, and may control a power plant 1506 driving a load 1532. FIG. 16 shows a wave diagram 1600 illustrating the behavior of the load current when employing a predictive mid-point current regulator (and similar to wave diagram 1400 shown in FIG. 14). A new target average current per phase may be computed from the value of the present current and the voltage error. Accordingly, for each phase, the following equation may be used to determine the target current value $I_{targ}$, towards which each phase current may be ramped, using a PID control method:

$$I_{targ} = I_{aver} + P^* v_{error} + I^* \text{integ}(v_{error}) + D^* \text{deriv}(v_{error}).$$

As seen in the equation above, the proportional, integral, and derivative control may be applied according to the voltage error. Ramping of the currents in the current share configuration, i.e. the ramping of each phase current is towards the target value shown above, instead of towards a calculated average current value. This results in a more stable and faster ramping of all currents. The pulse on time ($t_{on}$) that will cause the inductor current to hit $I_{targ}$ at $t_{end}$ may be computed:

$$t_{on} = (I_{targ} - I(t))^* L / V\text{in} + V\text{out}/V\text{in}^*(t_{end} - t).$$

The system is left in a state compatible with steady-state operation at $I_{targ}$. Furthermore, the pulse start time ($t_{start}$) that delivers the charge in this cycle may be computed to equal $t_{sw}^* I_{targ}$.

If a new charge command (i.e. a new higher target current value) arrives following the start of the up-slope, especially if it is late in the cycle, the peak current may become excessively large. The following formulation limits the peak current such that the current at the end of the cycle is equal to the average current. Referring to FIG. 16, $t = t_{start}$, and $t_{end} = t_{sw}$.

$$t_{oni} = \frac{Q_{ci}}{t_{sw}(S_{on} + S_{off})} - \frac{I_o}{(S_{on} + S_{off})} + \frac{S_{off} \cdot t_{sw}}{S_{on} + S_{off}}$$

$$t_{start} = \frac{S_{off} \cdot t_{sw}^2}{2 \cdot t_{oni} \cdot (S_{off} + S_{on})} - \frac{t_{oni}}{2}$$

$$t_{on} \approx t_{oni} + \frac{Q_c - Q_{ci}}{(S_{on} + S_{off}) \cdot (t_{sw})}$$

where
$Q_{ci}$=Commanded Charge (before $t_{start}$), and
$Q_c$=Commanded Charge (after $t_{start}$).
If the commanded charge changes after $t_{start}$, the ending current in a cycle is set to the value of the new commanded average current.

Figure 17A:
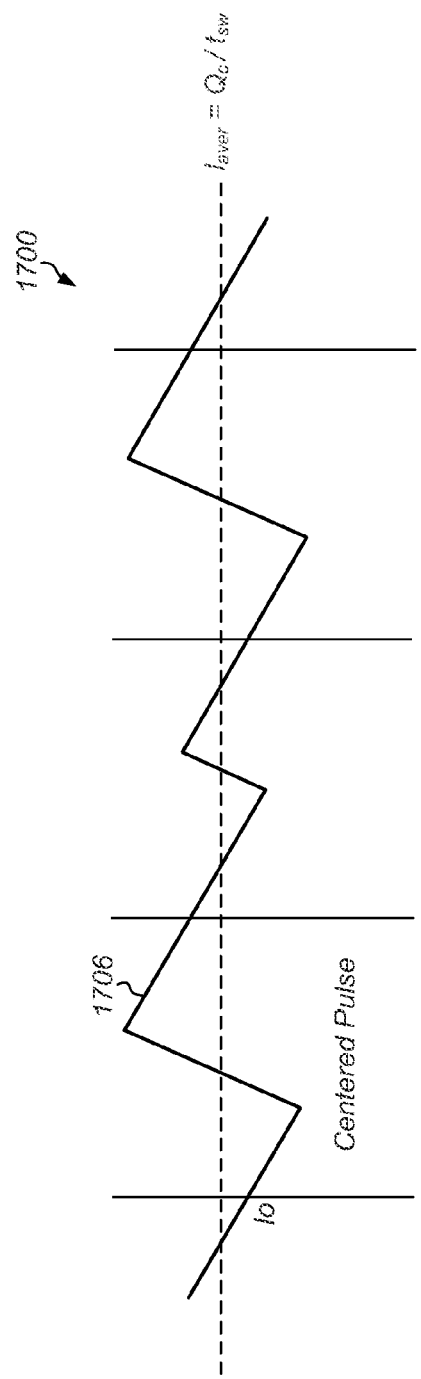
FIG. 17A shows a waveform diagram illustrating the behavior of the inductor current revealing a subharmonic oscillation issue.
Figure 17B:
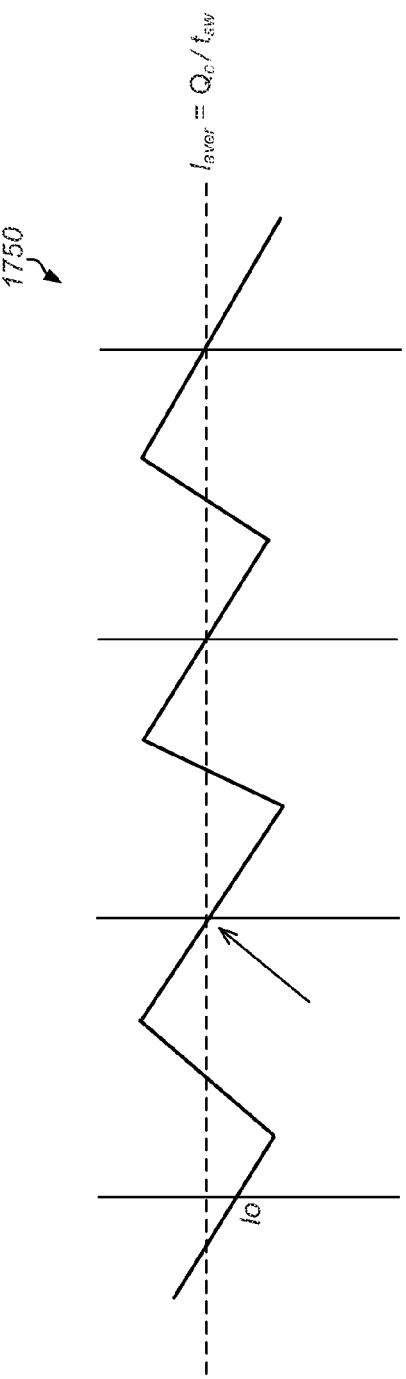
FIG. 17B shows a waveform diagram illustrating the behavior of the inductor current and how the subharmonic oscillation issue illustrated in FIG. 17A may be eliminated.

FIG. 17a shows a waveform diagram 1700 illustrating the behavior of the inductor current 1706 revealing a subharmonic oscillation issue. The average current level is indicated by the dashed line. Targeting the charge during a cycle to be $Q_c$ and constraining the pulse to be in the center of the cycle may lead to a subharmonic oscillation. The same kind of subharmonic oscillation may be found in conventional current mode and charge mode control. As illustrated by waveform diagram 1750 in FIG. 17b, the solution to the subharmonic oscillation issue is to target the endpoint indicated by the arrow to be at $Q_c/t_{sw}$, as an average charge of $Q_c$ eliminates the subharmonic oscillation while subsequent pulses are still centered in steady state.

Figure 18:
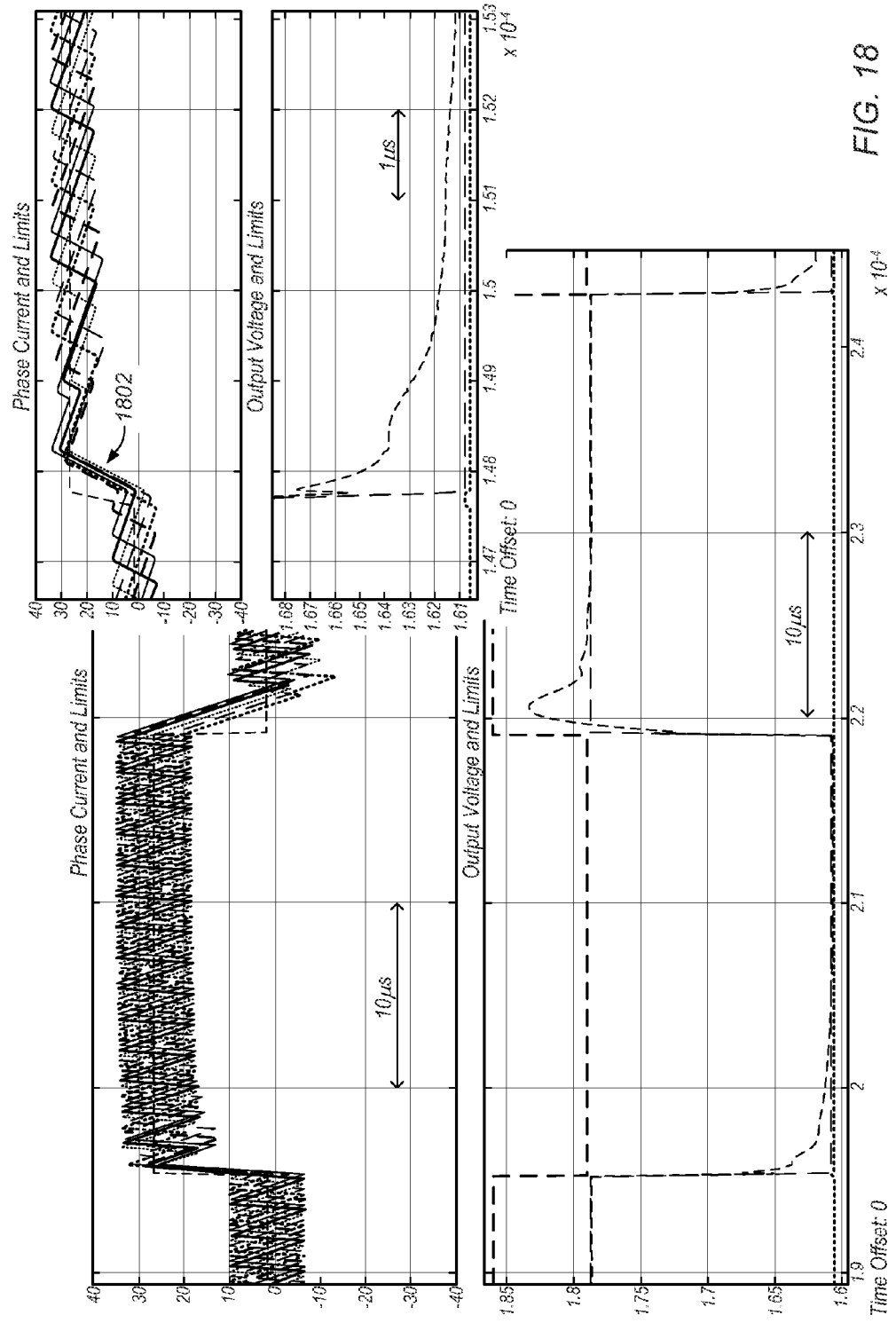
FIG. 18 shows waveform diagrams illustrating the behavior of the output voltage and multiple phase currents during a simulation for 10-150 A, using a 1 A/ns load step.
Figure 19:
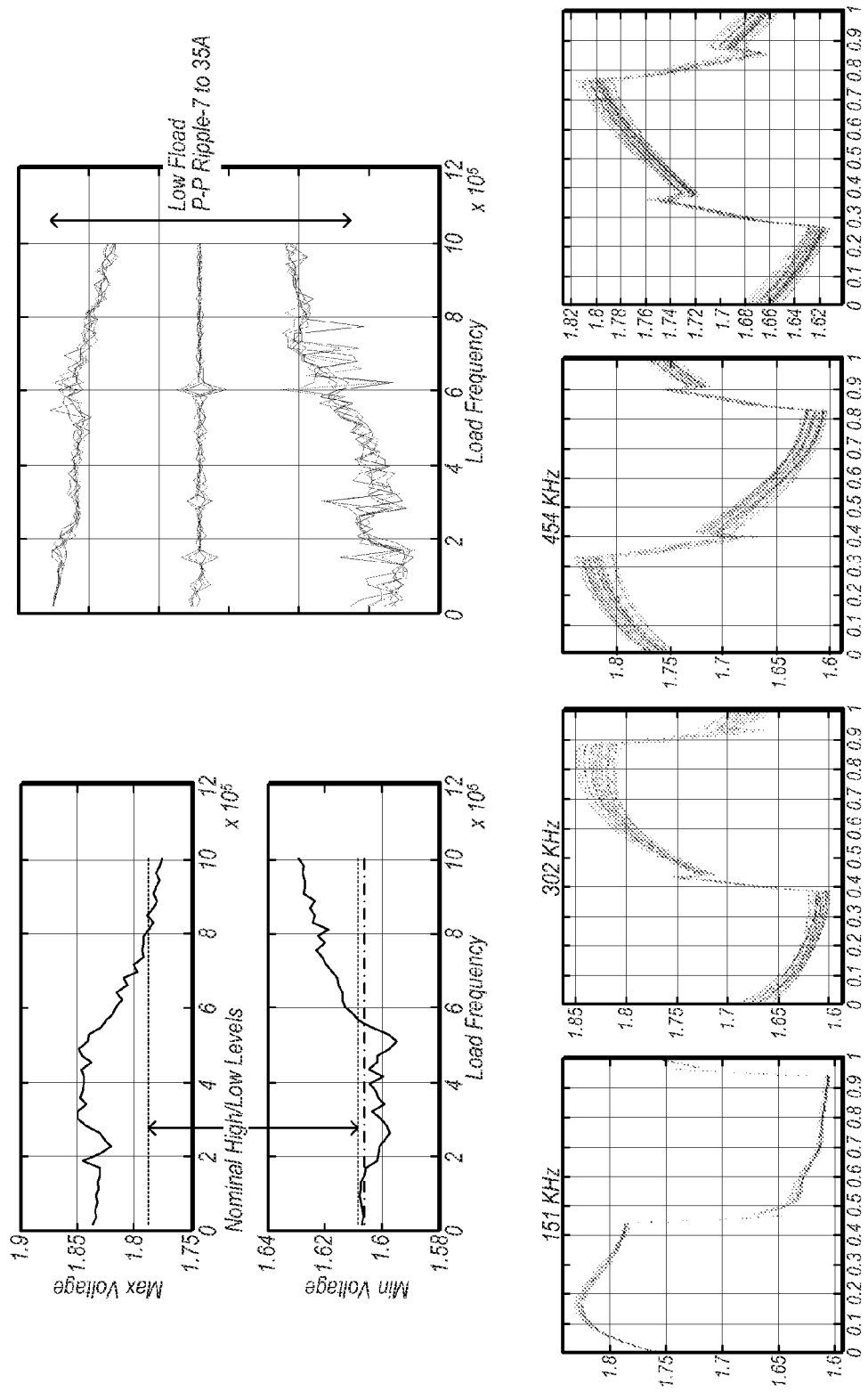
FIG. 19 shows waveform diagrams illustrating the behavior of the output voltage and multiple phase currents during a simulation for a load frequency sweep where the switching frequency is 600 KHz.
Figure 20:
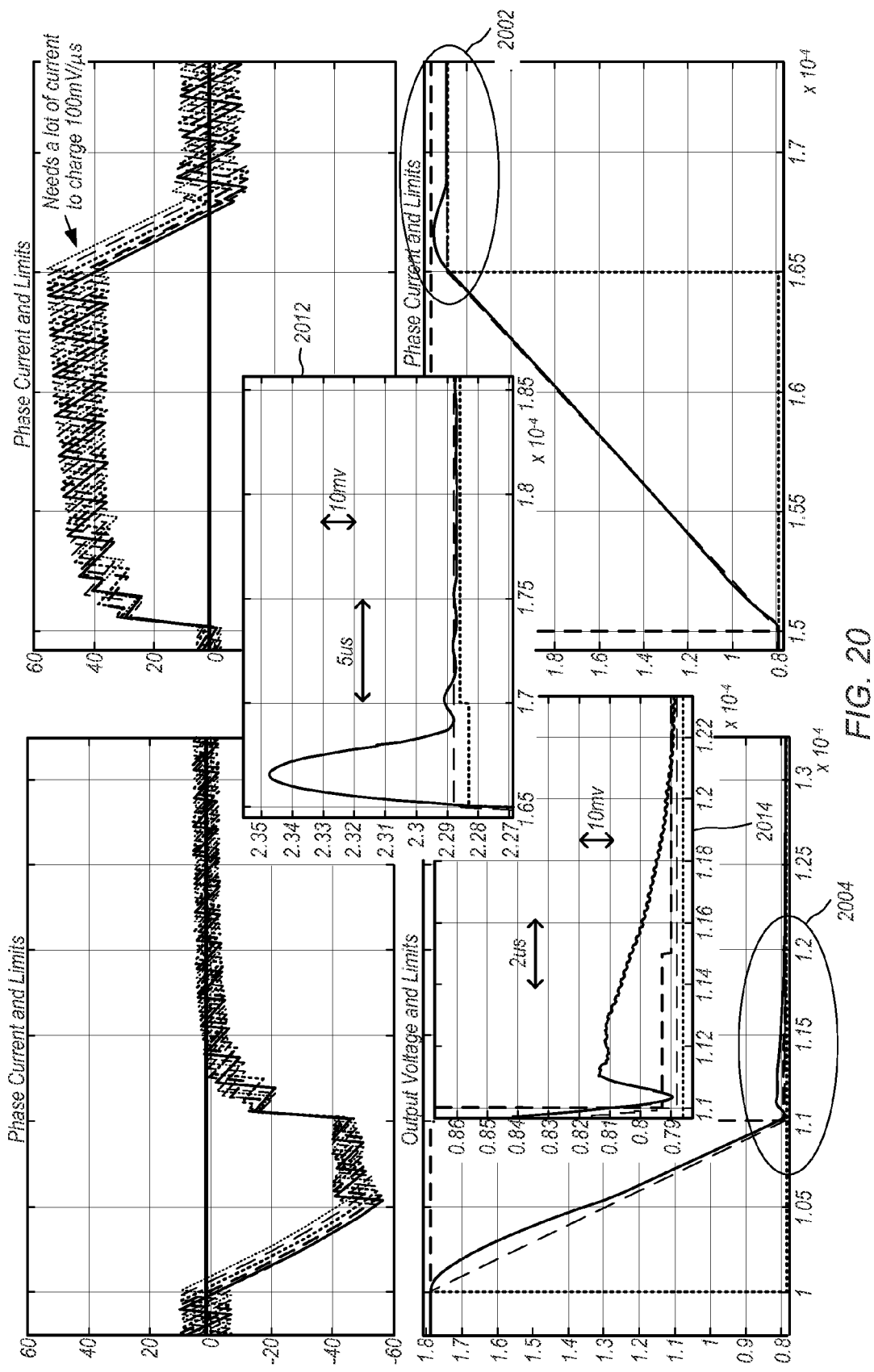
FIG. 20 shows waveform diagrams illustrating the behavior of the output voltage and multiple phase currents during a simulation for 1.8→0.8V, 0.8→2.3V at 100 mV/μsec.

FIG. 18 shows simulation results for 10-150 A, 1 A/ns load step (mid-point control). The top graph is a phase current graph that represents the phase currents and limits, while the bottom graph represents the output voltage and limits. The scale for the timeline is indicated for each graph. As observed in the enlarged (fine scale) version of the phase current graph at 1802, a continuous pulse advance feature means that no undershoot occurs at any step height. FIG. 19 shows simulation results for load frequency sweep ($F_{sw}$=600 KHz). It should be noted, however, that "beating" between repetitive load and the switching frequency may result in undesirable behavior. This may be mitigated to some extent with a ripple filter at the switching frequency. Using target current control rather than current balance control also mitigates the "beating" effect. FIG. 20 shows simulation results for 1.8→0.8V, 0.8→2.3V at 100 mV/μsec. Circled area 2002 is shown enlarged in graph 2012, and circled area 2004 is shown enlarged in graph 2014. The compensator may include a calculated voltage ratio duty-cycle to off-load the integrator, and $R_{droop}*C_{load}*dV/dT$ compensation to avoid lag. Peak currents to slew load capacitors at this rate are high, therefore the use of wider voltage ADC full-scale range may be beneficial to cover $R_{droop}*I_{charge}$.

Digital Compute Multiphase Controller

Some common factors for digital VR (Voltage Regulator) controllers, or controllers for voltage regulator modules (VRMs) may include support VR12.5 features with 1-6 phases, a specified sample rate (Fs) (e.g. nominally 24*$F_{sw}$), $V_{droop}$ applied in analog domain before voltage error ADC, current sensing for balance performed with single multiplexed current ADC, digital current estimator for ripple updated with low-pass filtered measurements for DC accuracy, and use of fractional Fs delays for high resolution in digital PWM. While these common factors are in reference to VR controllers, and more specifically digital VR controllers in general, it will further become evident how these factors may be accounted for in the various embodiments of a novel digital multiphase controller disclosed herein. In various embodiments, two different modulation architectures may be considered for a digital multiphase controller. A fixed frequency predictive-current with load-driven pulse advancement (exemplified in FIG. 15), and/or variable frequency digital EAPP (Enhanced Active Pulse Positioning) modulator with load transient detection comparators (exemplified in FIG. 21).

Figure 15:
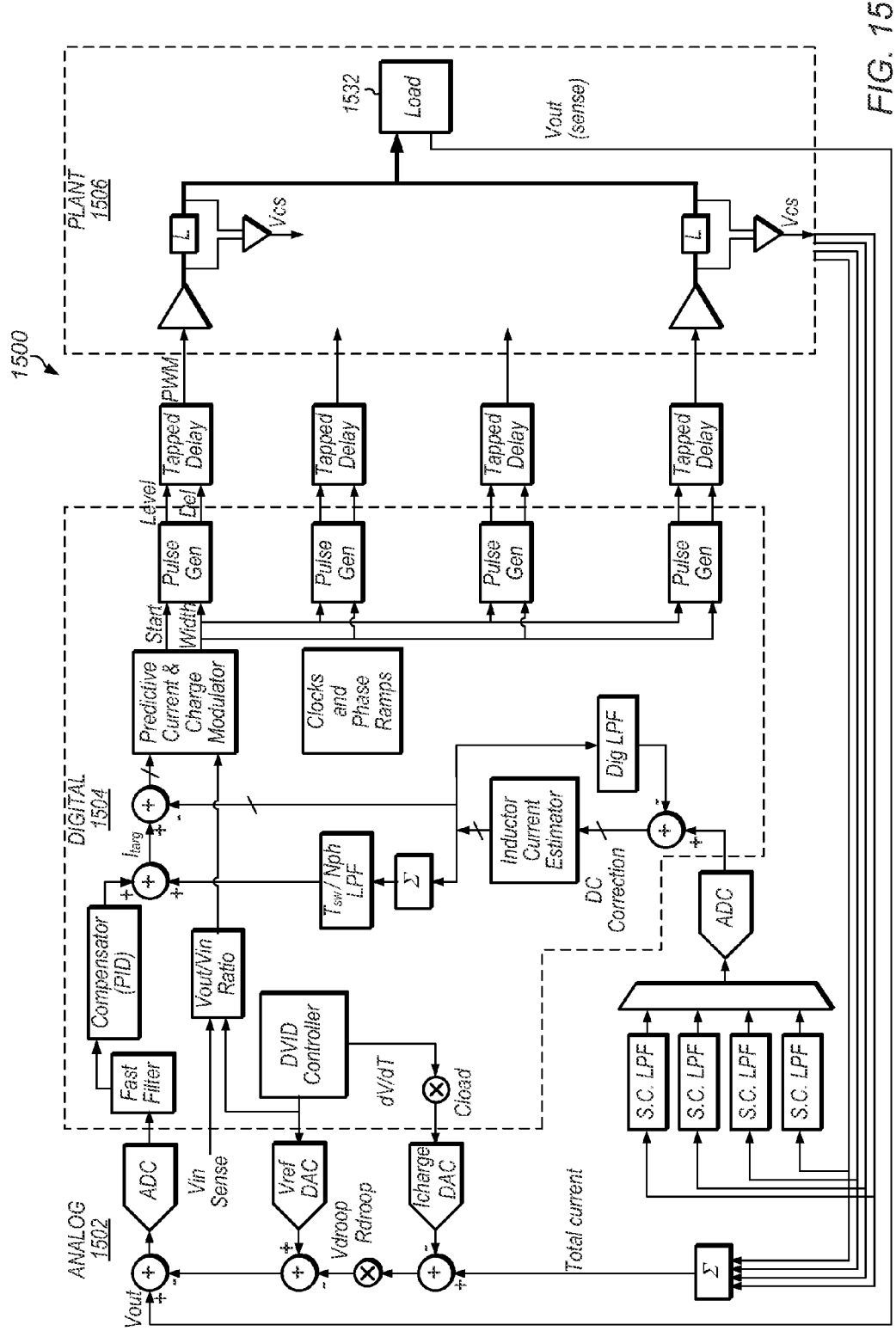
FIG. 15 shows the block diagram of one embodiment of a controller for a voltage regulator that may be used in a current sharing configuration.
Figure 16:
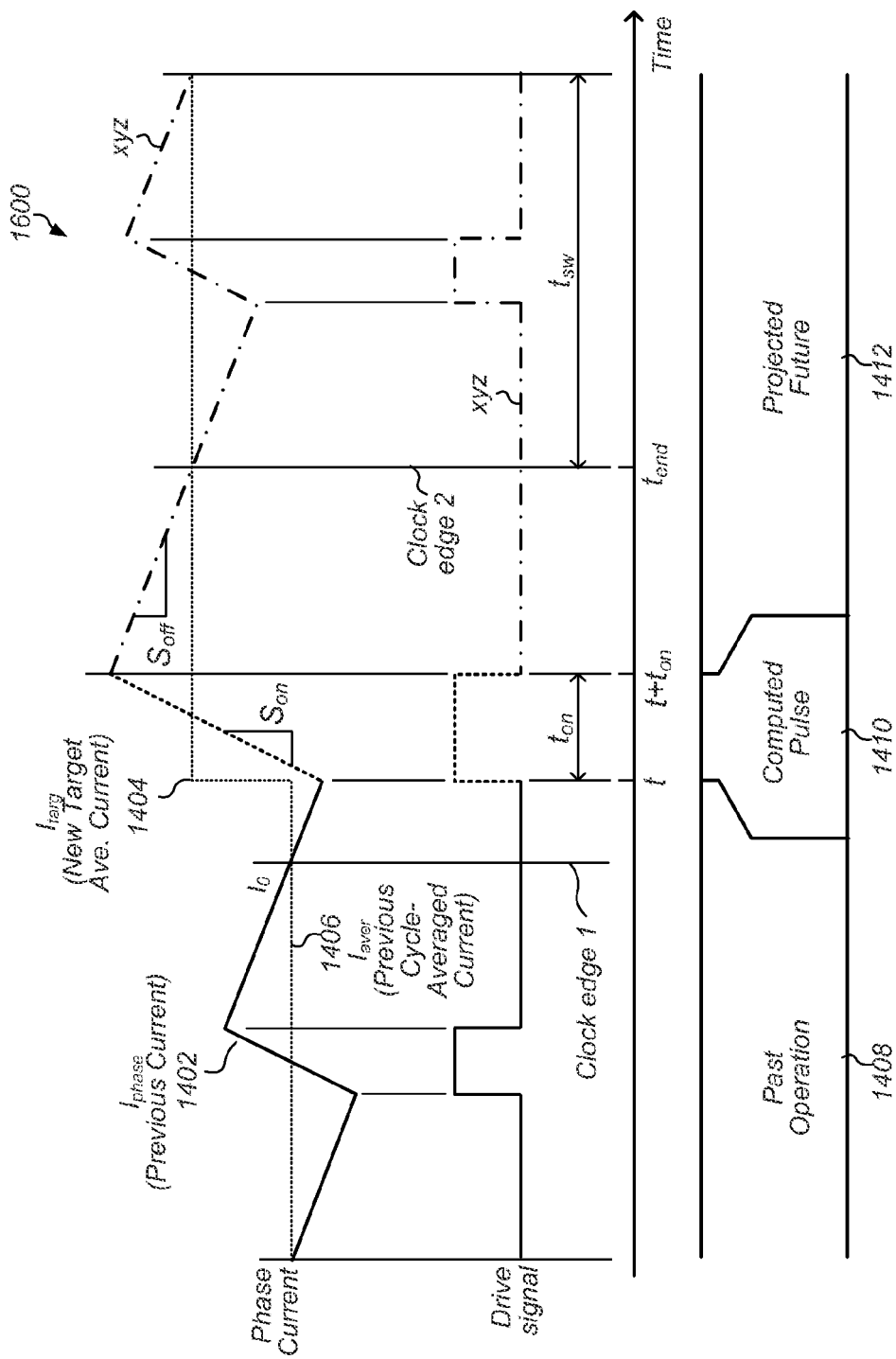
FIG. 16 shows a waveform diagram illustrating the behavior of the load current (phase current) when employing a predictive mid-point current regulator.
Figure 21:
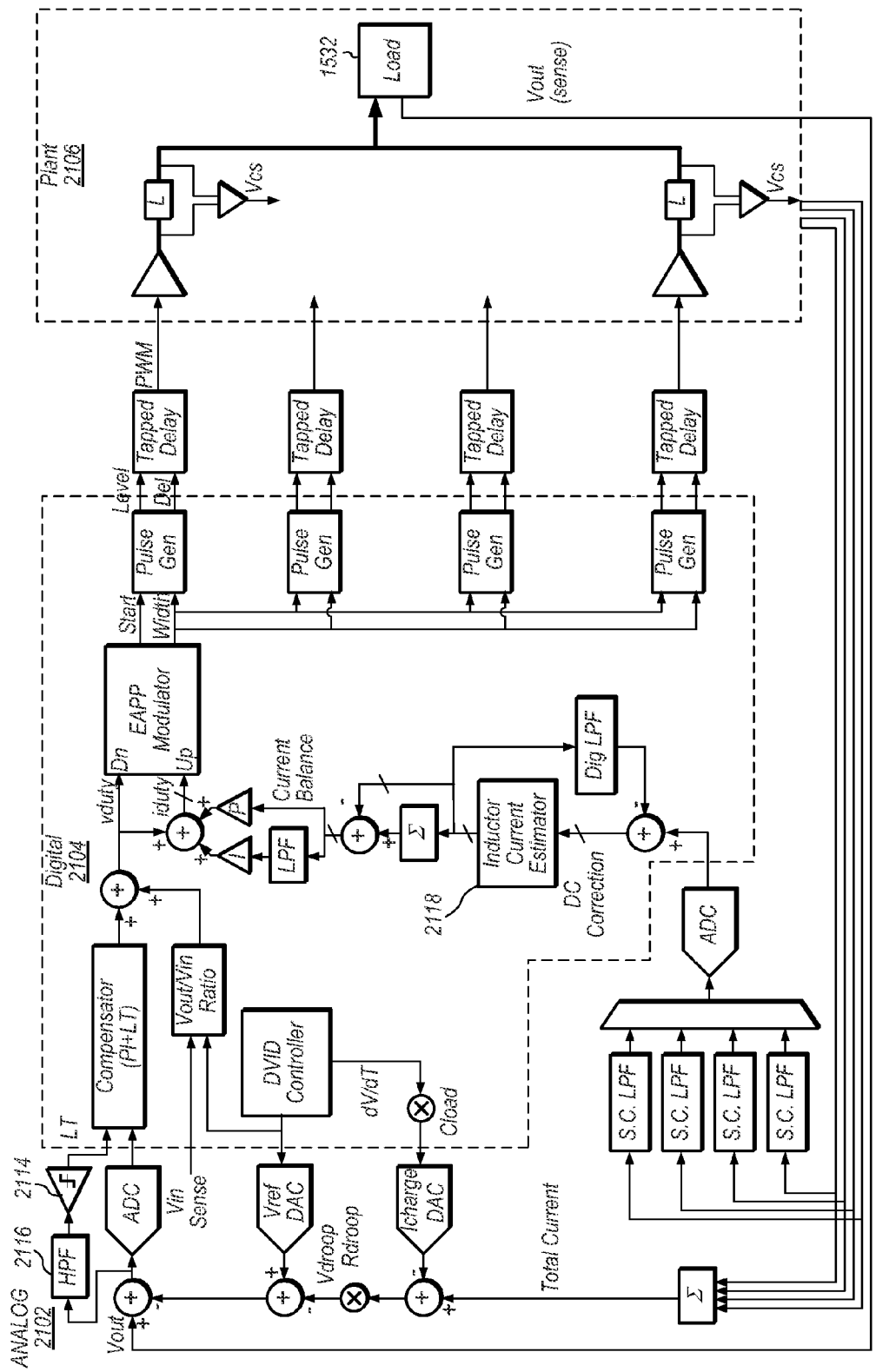
FIG. 21 shows the block diagram of one embodiment of a variable-frequency digital EAPP (Enhanced Active Pulse Positioning) controller for a voltage regulator that may be used in a current sharing configuration.
Figure 22:
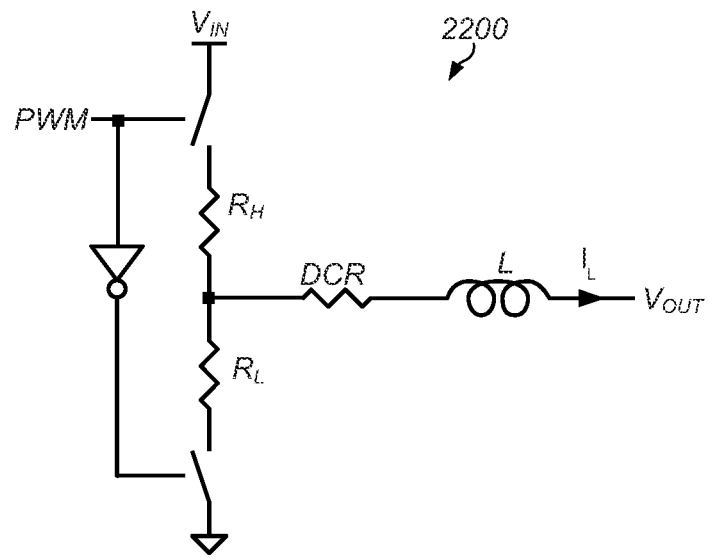
FIG. 22 shows a circuit that provides the basis for one embodiment of an inductor current estimator.
Figure 23:
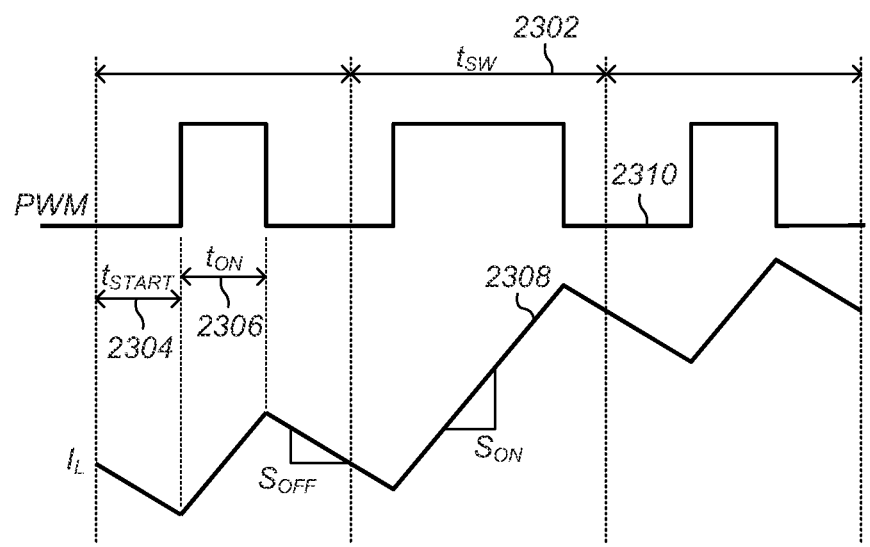
FIG. 23 shows a waveform diagram illustrating the behavior of the inductor current and the corresponding drive signal during operation of the circuit shown in FIG. 22.

The block diagram of one embodiment of a fixed-frequency predictive current loop based controller is shown in FIG. 15, and has been previously referenced above. The block diagram of one embodiment of a variable-frequency digital EAPP loop is shown in FIG. 21. Differences from the fixed-frequency controller of FIG. 15 include the addition of HPF (high pass filter) 2116 and comparators 2114 for load transient (LT) detection, which were added to the compensator, replacing the derivative term. Thus, as seen in FIG. 21, instead of a PID compensator (which appears in digital section 1504 in FIG. 15), a PI+LT compensator appears in digital section 2104 in FIG. 21. An inductor current estimator 2118 is used for current balance with extra low-frequency gain boost to remove static balance errors. FIG. 22 shows a circuit 2200 that may provide the basis for an inductor current estimator. The behavior of the inductor current for the circuit 2200 is illustrated in FIG. 23. Referring to FIGS. 22 and 23, the following differential equation may be obtained for the current:

$$(R_H+DCR)*I_L(t)+L*dI_L(t)/dt=V_{IN}-V_{OUT} \text{ (if PWM==1)}$$

$$(R_H+DCR)*I_L(t)+L*dI_L(t)/dt=-V_{OUT} \text{ (if PWM==0)}.$$

The approximate slopes for 1st order and as a function of time are given by:

$$S_{ON}\sim=(-V_{OUT}-(R_H+DCR)*I_L(t))/L \text{ (up slope)}$$

$$S_{OFF}\sim=(V_{OUT}+(R_L+DCR)*I_L(t))/L \text{ (down slope)}.$$

The discrete time approximation may expressed as:

$$I_L(n*t_S)=I_L((n-1)*t_S)+t_S*S_{ON}*\text{PWM}-t_S*S_{OFF}*(1-\text{PWM})$$

$$I_L(n*t_S)=I_L((n-1)*t_S)*(1-(DCR+R_L*(1-\text{PWM})+R_H*\text{PWM})*t_S/L)-t_S*V_{OUT}/L+\text{PWM}*t_S*V_{IN}/L.$$

This may be implemented as:

$$I_L(n)=I_L(n-1)*(1-\text{loss})-\text{const1}+\text{PWM}*\text{const2}+K*(LPF(\text{Isense})-LPF(I_L)).$$

A simpler estimator (using loss term) may be used in D-EAPP model, while a more complex estimator with hi/low resistances may be used in predictive loop model. The more complex version may compute steady-state voltage duty-cycle from $S_{OFF}/(S_{ON}+S_{OFF})$, derived from same parameters as above, rather than VID/Vin.

Figure 24:
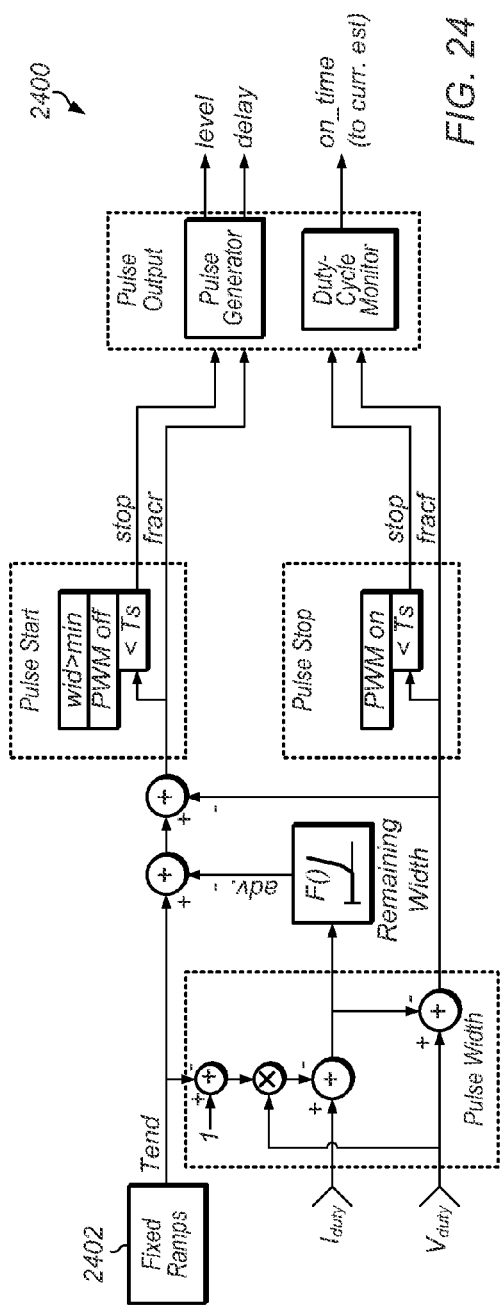
FIG. 24 shows the block diagram of one embodiment of a predictive current modulator with fixed frequency.
Figure 25:
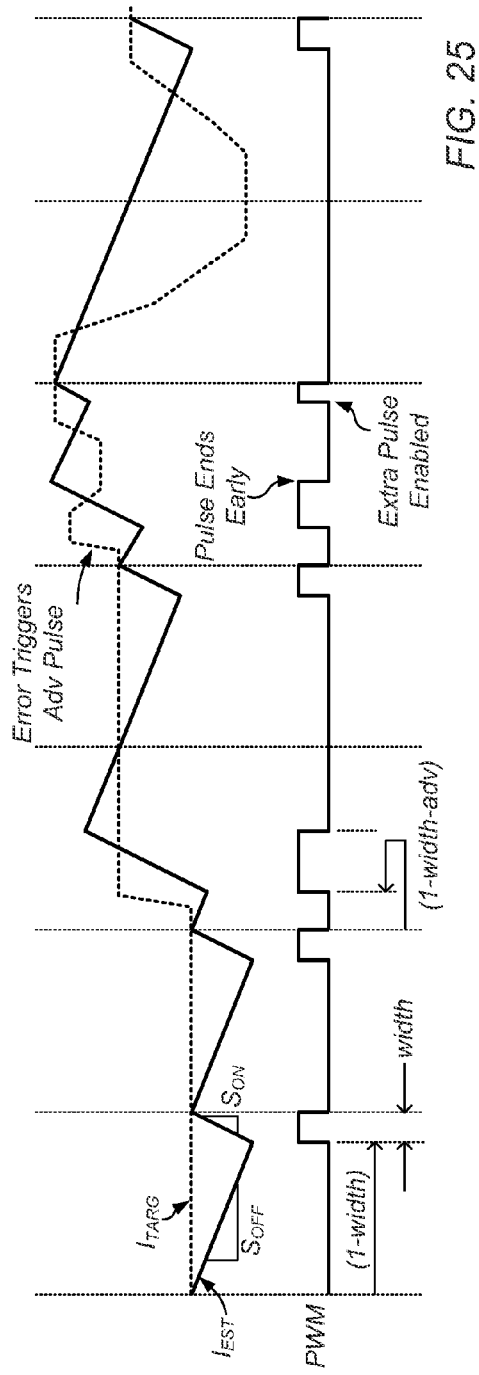
FIG. 25 shows a waveform diagram illustrating the behavior of the inductor current and the corresponding drive signal during operation of the circuit shown in FIG. 24.

The block diagram of one embodiment of a predictive current modulator 2400 with fixed frequency is shown in FIG. 24, with the corresponding inductor current waveform illustrated in FIG. 25. Basic pulse positioning may be performed like APP, leading edge with trailing edge adjustment. The pulse trigger may advance if the error gets high via a non-linear curve. Extra pulses may be fired after an early pulse, if the error exceeds a specified threshold value. The underlying ramps may have a fixed rate (e.g. from ramp generator 2402), and may count time until the end of the switching cycle. This may be used to compute the pulse-width that would result in reaching the target current value. Early pulses may be set to reach the target current value at end of the cycle. Pulse start/stop and fractional delays may be computed to get a high PWM resolution.

Referring to FIG. 24:

$$V_{duty}=V_{OUT}/V_{in}$$

$$I_{targ}=\text{sum}(I_{est})/Nph+\text{PID}(V_{error})+I_{ripple}/2$$

$$I_{duty}=(I_{est}-I_{targ})*(S_{on}+S_{off})$$

$$\text{Width}=I_{duty}+T_{end}*V_{duty}$$

$$\text{adv}=F(I_{duty}-(1-T_{end})*V_{duty})$$

Figure 26:
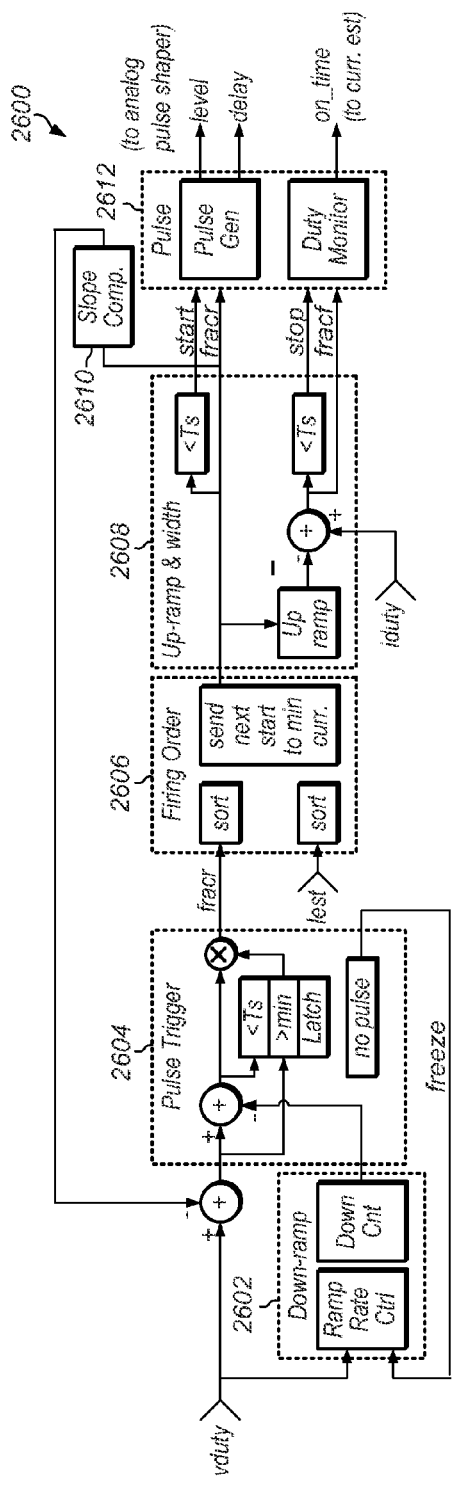
FIG. 26 shows the block diagram of one embodiment of a digital EAPP modulator.
Figure 27:
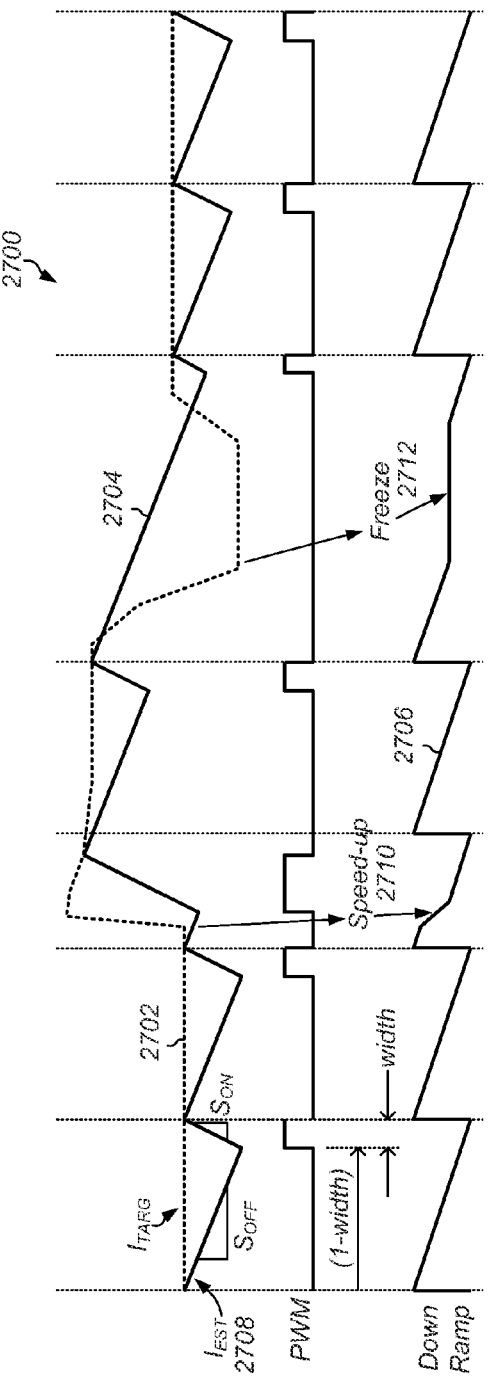
FIG. 27 shows a waveform diagram illustrating the behavior of the inductor current and the corresponding drive signal during operation of the circuit shown in FIG. 26.

The block diagram of one embodiment of a digital EAPP modulator 2600 is shown in FIG. 26, with a corresponding inductor current waveform illustrated in FIG. 27. Rapid increases in $V_{duty}$ (the total compensator output) may speed-up down ramps (generated in block 2602), allowing pulses to start sooner and advancing the entire clock cycle. The pulse may trigger (according to pulse trigger block 2604) when the ramp crosses the value representative of $V_{duty}$ during this sample time, one pulse per cycle. The ramps may freeze if the duty-cycle falls and no pulses are present. The phases may be reordered to balance the currents quickly (according to firing order module 2606). The present duty ramp may set the remaining on-time, with a small up-ramp adjustment (according to up-ramp and width module 2608). Slope compensation may be performed according to module 2610, with the pulses generated according to module 2612.

Figure 28:
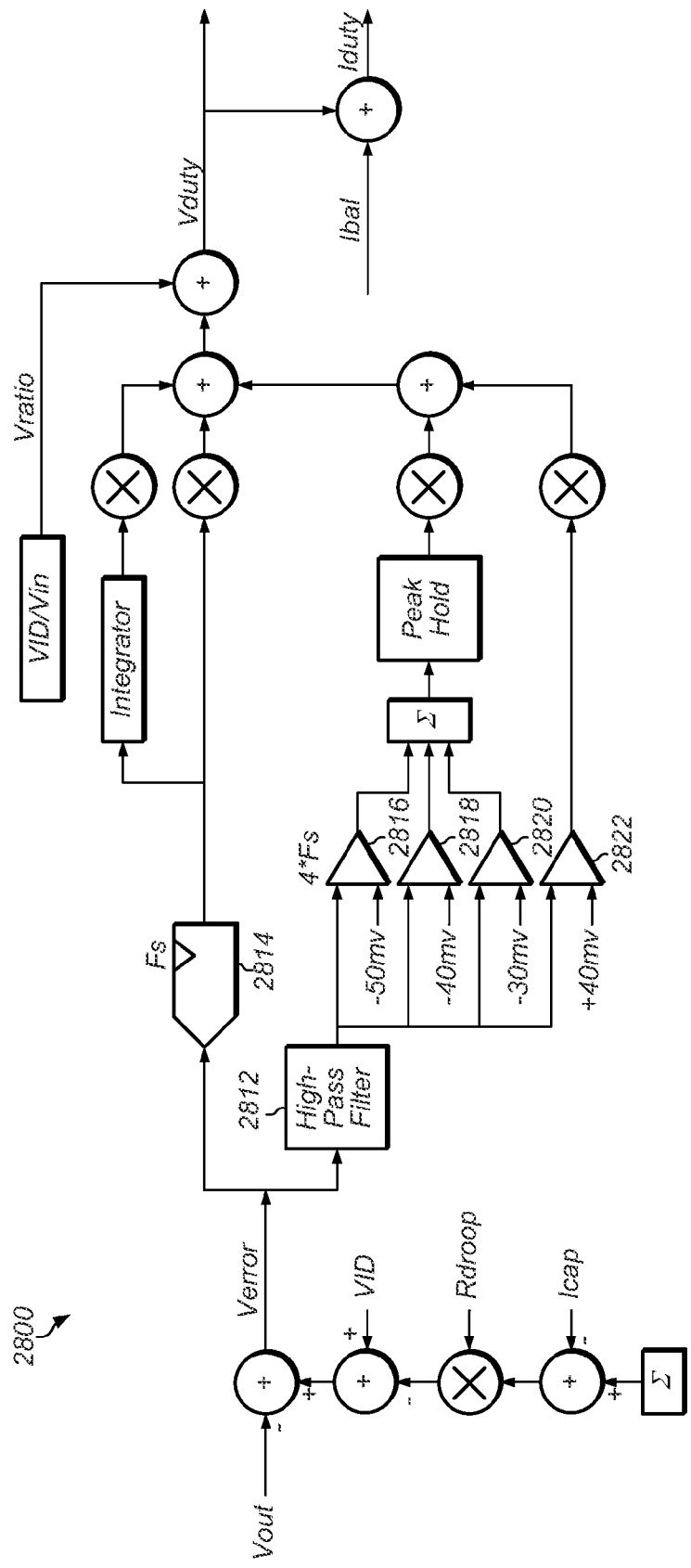
FIG. 28 shows the block diagram of one embodiment of a fast load-transient detector (D-EAPP)

The block diagram of one embodiment of a fast load-transient detector (D-EAPP) 2800 is shown in FIG. 28. Digital EAPP model 2800 adds a low-latency load transient detector, to speed up the pulse triggering and cutoff at load release. HPF 2812 (high pass filter, e.g. cutoff at 800 KHz) may feed three comparators 2816, 2818, and 2820 for load application (i.e. when a load is applied), and a comparator 2822 for load release. Apply peaks may be stretched and used to generate the derivative term. A high sample rate may be used in the comparators, while down-stream calculations may be performed at Fs (according to module 2812).

Predictive Current Control

Figure 29A:
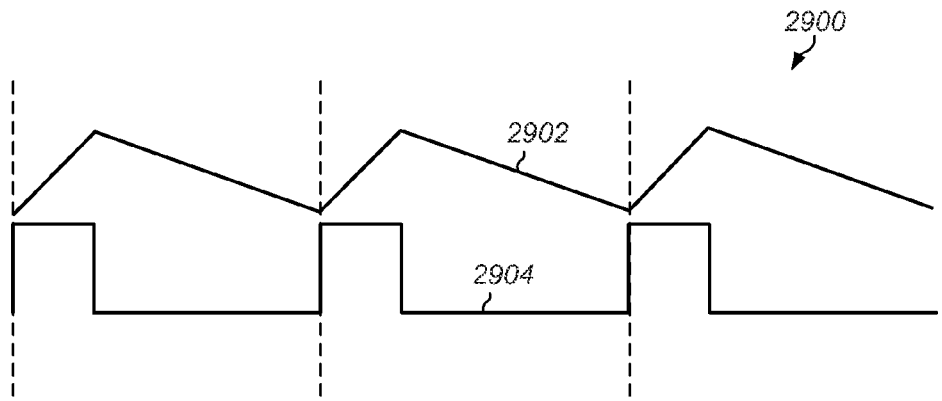
FIG. 29A shows a waveform diagram illustrating a first possible placement of the "on time" for a high side FET control signal in the context of the inductor current.
Figure 29B:
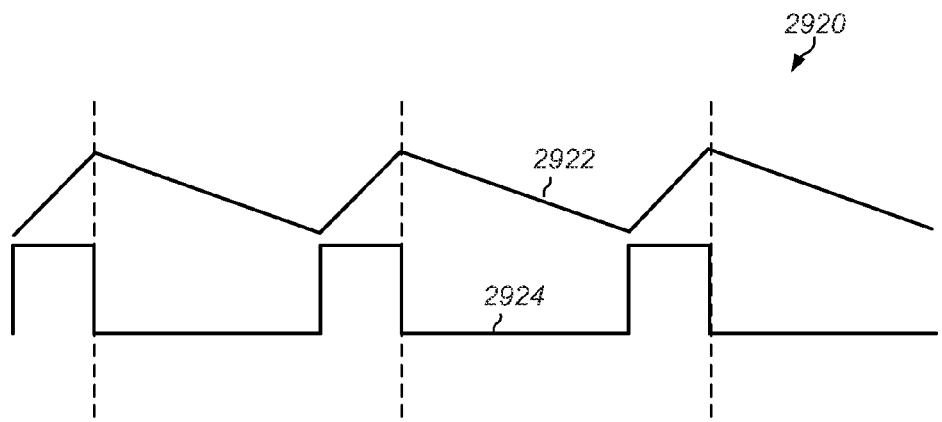
FIG. 29B shows a waveform diagram illustrating a second possible placement of the "on time" for a high side FET control signal in the context of the inductor current.
Figure 29C:
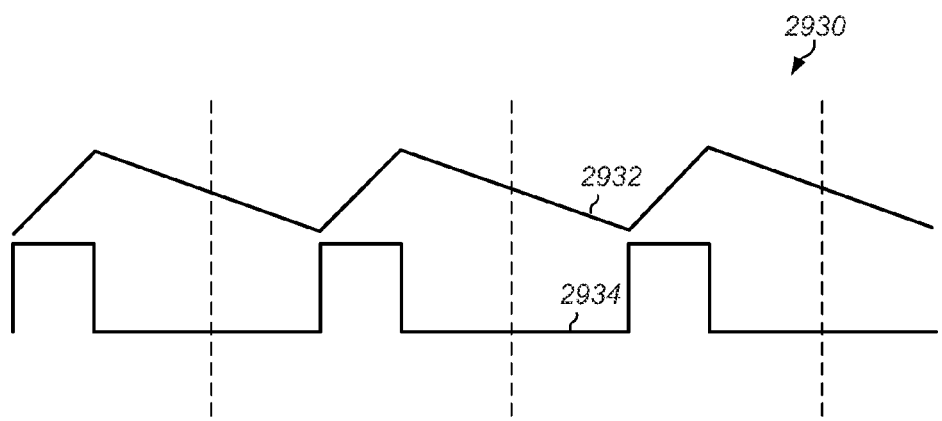
FIG. 29C shows a waveform diagram illustrating a third possible placement of the "on time" for a high side FET control signal in the context of the inductor current.

Predictive current control—in reference to the digital pulse placement described above—may be used to determine where the pulse is placed, that is, where the pulse may be applied. In steady state, the "on time" between the clock edges of the high side FET control signal may be positioned at any desired point in time. Possible positioning of the "on time" is illustrated in FIGS. 29A-29C. The dashed lines represent positioning of the "on time". As shown in diagram 2900 of FIG. 29A, the "on time" for control signal 2904 is positioned "as soon as possible" (ASAP), resulting in inductor current waveform 2902. As shown in diagram 2920 of FIG. 29B, the "on time" for control signal 2924 is positioned "as late as possible" (ALAP), resulting in inductor current waveform 2922. Finally, as shown in diagram 2930 of FIG. 29C, the "on time" for control signal 2934 is centered, resulting in inductor current waveform 2932. Given a known current at the beginning of the cycle, for each of these cases, a target current value, an end current value, a start time, and a stop time may be defined. ASAP control starts the pulse at the beginning of the cycle. Thus the only controlled edge is the turn-off. ALAP and Centered modes allow for dual edge modulation. Both ALAP and Centered modes push the relevant edges forward to respond to transients. If the current needs to increase, the turn-on edge pushes forward in time. If the current needs to decrease, the turn-off edge moves forward in time as well.

Figure 30A:
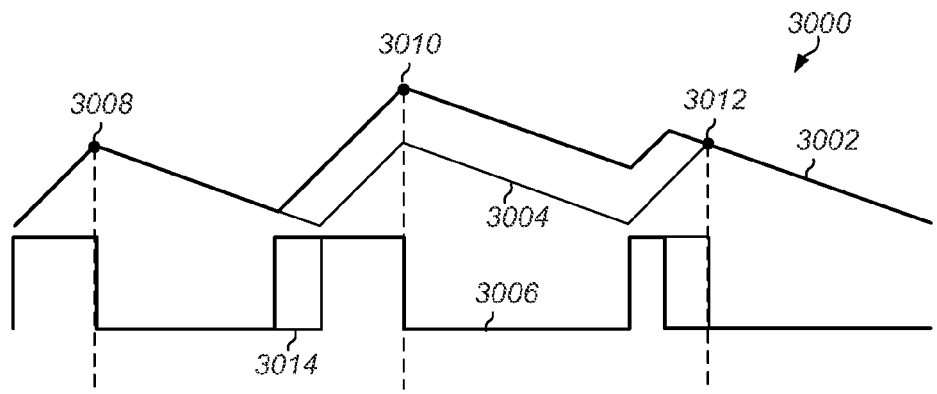
FIG. 30A shows a waveform diagram illustrating the high side FET control signal and the inductor current.

As shown in diagram 3000 of FIG. 30A (3002), with ALAP, the turn-on for control signal 3006 moves forward in time (see 3014) given a larger target current at 3010 (relative to the current at 3008 at the beginning of the cycle). Furthermore, although ALAP pushes the turn-on such that the turn-off is targeted to be at the clock edge (see 3004 in FIG. 30A, also the current value at 3012), once turned on, the turn-off edge can be adjusted earlier as the target current 3002 decreases. In contrast to the centered modulation, the ALAP modulation provides more opportunity to pull a pulse forward in time. From steady state, the ALAP modulation allows a pulse to move forward ~90% (assuming 12V to 1.2V, for example) of the duty-cycle and directly proportional to the error command. From steady state, the centered modulation allows a pulse to move forward ~45% of duty-cycle while the turn-on edge is pulled in at half the rate of what would occur using ALAP modulation, since the turn-on edge moves forward and the turn-off edge moves backward. By using ALAP modulation, there is less likelihood of chatter since the turn on edge is pushed as late in the cycle as needed while still achieving the target current. This leaves less opportunity for chatter. In addition, there is no constraint to keep the pulse centered when using ALAP modulation.

Figure 30B:
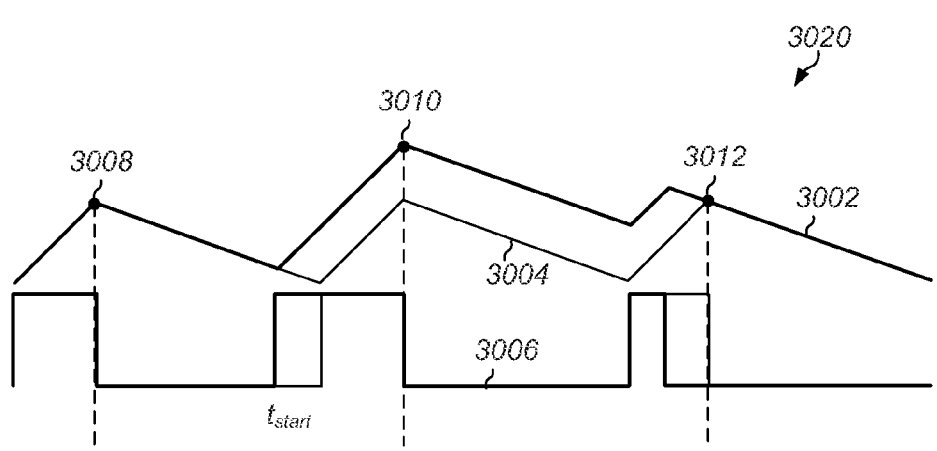
FIG. 30B shows a waveform diagram illustrating the high side FET control signal and the inductor current, indicating a "start time" parameter corresponding to applicable control equations for performing predictive current control.

The control equations corresponding to the ALAP modulation illustrated in FIG. 30a may established as follows. Referring to FIG. 30B, indicating the start time $t_{start}$, and currents $I_o$ and $I_c$:

$$t_{start-steady-state} = \frac{S_{on} \cdot t_{sw}}{(S_{off} + S_{on})} = t_{sss}$$

$$t_{on-steady-state} = \frac{S_{off} \cdot t_{sw}}{(S_{off} + S_{on})} = t_{oss}$$

$$t_{start} = \frac{I_o + S_{on} \cdot t_{sw}}{(S_{off} + S_{on})} - \frac{I_c}{(S_{off} + S_{on})} = t_{sss} - \frac{I_c - I_o}{(S_{off} + S_{on})}$$

$$t_{start} = t_{sss} - K \cdot \Delta I$$

Figure 30C:
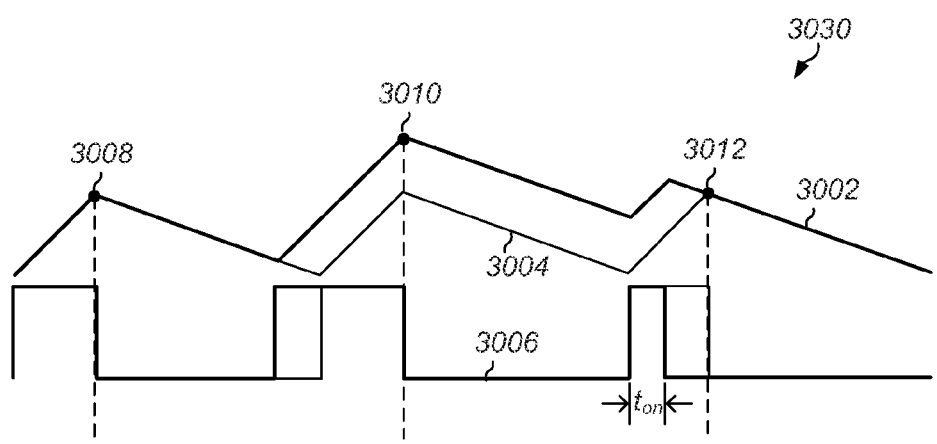
FIG. 30C shows a waveform diagram illustrating the high side FET control signal and the inductor current, indicating an "on time" parameter corresponding to applicable control equations for performing predictive current control.

Once turned on, the on time may be adjusted. Referring to FIG. 30C, indicating the on time $t_{on}$:

$$t_{on} = \frac{I_c - I_o}{(S_{off} + S_{on})} + \frac{S_{off} \cdot t_{sw}}{(S_{off} + S_{on})}$$

$$t_{on} = K \cdot \Delta I + t_{oss}$$

It should be noted that some hysteresis may be applied to $t_{on}$ (i.e. turning off before the clock edge) such that a significant change in the current command is to be applied before the turn-off edge moves, which further reduces chatter.

Further analysis indicates that a small inductor (and large voltage across the inductor) may result in the current ramping up quickly. E.g., for Vin=12V, Vout=1.2V, L=100 nH, Max current step=20 Amp, and fsw=600 kHz:

$$t_{on} = \frac{L \cdot \Delta I}{V} = 185 \text{ ns}.$$

Figure 31:
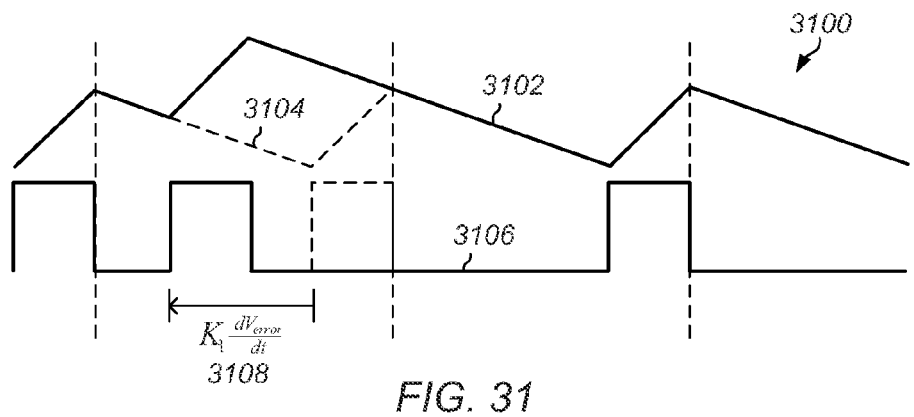
FIG. 31 shows a waveform diagram illustrating the behavior of the inductor current and corresponding drive signal, indicating that a derivative term may be used to move the pulse forward without changing the pulse-width (duty-cycle)

This means that a small change (e.g. ~11%) in the duty-cycle may achieve the required current. If the steady state duty-cycle is 10% (1.2V/12V), the maximum duty-cycle may not need to exceed ~30%. In this example, 100% duty-cycle results in a current change of 180 A. Therefore, it is preferable not to pull the start of the current ramp forward in time using exclusively the duty-cycle, else the current limit of the inductor may be exceeded. Accordingly, in one embodiment, the derivative term may be used to move the pulse forward without changing the pulse-width (duty-cycle), as illustrated in diagram 3100 of FIG. 31. As seen in diagram 3100, the pulse of control signal 3106 may be moved forward (3108), resulting in a change of target current 3102 that deviates from the change (3104) of the target current that would have been expected if the pulse had not been moved forward. This effectively increases charge in a cycle but maintains the exit current value, as shown in the following equations:

$$t_{sss} = \frac{S_{on} \cdot t_{sw}}{(S_{off} + S_{on})}$$

$$t_{oss} = \frac{S_{off} \cdot t_{sw}}{(S_{off} + S_{on})}$$

$$t_{start} = t_{sss} - K_0 \cdot \Delta I - K_1 \frac{dV_{error}}{dt}$$

Once turned on . . . the on time may be adjusted:

$$t_{on} = K_0 \cdot \Delta I + t_{oss}.$$

Referring back to the equation for $t_{start}$, regulation is achieved via $t_{sss}$, which represents the integral term setting the steady state voltage, stability and current share are achieved via "$K_0 * \Delta I$", which represents the proportional term setting the endpoint current, and fast response is achieved via "$K_1 * dV_{error}/dt$", which represents the derivative term setting additional charge in the cycle. Thus, control is achieved as a combination of voltage-mode, current-mode, and charge control. To put it another way, the integral term sets the steady state conversion ratio such that to first order, it is independent of current. The proportional term adjusts the exit current of a cycle, while the derivative term adds charge to a cycle without impacting the exit current. Thus, all three terms are mostly decoupled from each other, which may greatly simplify "tuning".

It should be noted that the on-time equation does not contain the dV/dt term. Once a pulse has started, the dV/dt term has no impact on that pulse. For example, if the leading edge were moved to the left, due to a positive dV/dt, the pulse may start, but then the dV/dt would turn negative and would push the starting point to a later time. The pulse does not turn back off until the on-time has been satisfied. It should also be noted that the on-time may change once the pulse has started, which may be facilitated by the target current being updated more than once per switching period. The question also arises whether the right edge of the pulse would continue to move toward the left clock edge, potentially leading to a zero duty-cycle pulse when the dV/dt term is so large that it pushes the left edge of the pulse past the left clock edge. However, the dV/dt term may not impact the duty-cycle. Even if the dV/dt term drives the left edge of the pulse to the right clock edge, the duty-cycle may remain at the value determined by the integral and proportional terms.

The approach described above includes a number of non-linearities. The dV/dt term acts on the start time and not on the on time, and it acts until the pulse starts. Because of ALAP, the dV/dt term moves the pulse forward in time. Thus, charge may be added and not removed by the dV/dt. If centered modulation were used, then this nonlinearity would be removed, which indicates that centered modulation may be considered in lieu of ALAP modulation.

Fixed-frequency Predictive Current Control Loop

In one set of embodiments, according to the predictive current control described above, a controller may be implemented to perform regulation according to a digital multiphase voltage regulator control loop that operates at a fixed-frequency and uses current prediction to compute pulse-widths. The regulator may include inductor current estimator circuits to reduce demands on current sensing circuit bandwidth and latency. One example of a current estimator circuit is shown in FIG. 22. The controller may perform its calculations at a sampling frequency that is a significant multiple of the per-phase switching frequency (e.g. 24× to 32×) to provide fast response to load transients and stable response with high closed-loop bandwidth (Fsw/2).

As mentioned above, one embodiment of the basic circuit model of an inductor current estimator is shown in FIG. 22. The current in the inductor ($I_L$) is modeled as a primary function of the drive waveform PWM, and is illustrated by the current waveform shown in FIG. 23. For the purpose of this model, Vin, Vind, and Vout are assumed to be known. The inductor current is solved by using the basic KVL equation for that branch:

$$V_{IN} - V_{IND} = I_L * R_H + I_L * DCR + L * dI_L/dT \text{ when PWM==(on)} \quad (1)$$

or $$-V_{IND} = I_L * R_L + I_L * DCR + L * dI_L/dT \text{ when PWM==0 (off)} \quad (2)$$

The magnitudes of the instantaneous slopes of the current ($dI_L/dT$) are given by:

$$S_{ON} = (V_{IN} - V_{IND} - I_L * (R_H + DCR))/L \quad (3)$$

$$S_{OFF} = (V_{IND} + I_L * (R_L + DCR))/L \quad (4)$$

This may be solved using a discrete-time approximation using a sampling interval of $T_S$. During each time step, the PWM is on for the time $T_{ON}(n)$, which is expressed as a per-sample duty ratio $D_S(n) = T_{ON}(n)/T_S$. Solving for $I_L(n)$:

$$I_L(n) = I_L(n-1) + S_{ON} * T_S * D_S(n) - S_{OFF} * T_S * (1-D_S(n)) \quad (5)$$

expanding $$I_L(n) = I_L(n-1) + (V_{IN} - V_{IND} - I_L(n-1) * (R_H + DCR))/L * T_S * D_S(n) - (V_{IND} + I_L(n-1) * (R_L + DCR))/L * (1-D_S(n)) \quad (6)$$

collecting terms:

$$I_L(n) = I_L(n-1) * [1 - (R_H + DCR)/L * T_S * D_S(n) - (R_L + DCR)/L * T_S * (1-D_S(n))] + V_{IN}/L * T_S * D_S(n) - V_{IND}/L * T_S \quad (7)$$

or $$I_L(n) = I_L(n-1) * [1 - (R_L + DCR)/L * T_S - (R_H - R_L)/L * T_S * D_S(n)] + V_{IN}/L * T_S * D_S(n) - V_{IND}/L * T_S \quad (8)$$

The preceding description assumes that the regulator is using synchronous rectification continuous conduction mode, but that may not always be the case. More generally, both FETs may be turned off at some times, and then possibly one of their body diodes may conduct depending on the sign of the inductor current. The high diode may be on when the inductor current is negative, sending the current into the $V_{IN}$ source through a forward drop of $V_J$ plus an effective series resistance of $R_{JH}$. The KVL equation is:

$$V_{IN} + V_J - V_{IND} = I_L * R_{JH} + I_L * DCR + L * dI_L/dT \text{ when FETs off and } I_L < 0 \quad (9)$$

The low diode is on for positive current, supplying current from ground:

$$-V_J - V_{IND} = I_L * R_{JL} + I_L * DCR + L * dI_L/dT \text{ when FETs off and } I_L > 0 \quad (10)$$

If the inductor current is zero, neither diode will conduct, and the current will remain zero:

$$0 = I_L \text{ when FETs and diodes off.} \quad (11)$$

In discontinuous conduction mode the controller operates the low FET to emulate a diode, turning it off just as its current reaches 0. This time is computed as $D_{LO}(n) = T_{LO}(n)/T_S$, which is not greater than $1 - D_S(n)$, the continuous-conduction case. (It should be noted that now $D_S(n) = T_{HI}(n)/T_S$). The controller can command the high FET on, the low FET on, or both FETs off (Hi-Z). It may make one change in state per sample period, from low to high, high to low, Hi-Z to high, Hi-Z to low, high to Hi-Z, or low to Hi-Z. The fraction of time high or low during each sample period is indicated by $D_S(n)$ or $D_{LO}(n)$ respectively, with the Hi-Z time given as $1 - D_S(n) - D_{LO}(n)$.

The diodes naturally determine their own conduction times, leading to complex computations. While the FETs are Hi-Z, the current decays towards zero. The time available for the diode conduction is $T_S * (1 - D_S - D_{LO})$. If the magnitude of the current is high, the diodes do not turn off within the available time. If the current is near zero, the final current is zero. The problem area involves the sequence: does the Hi-Z portion appear before or after the driven portion? If Hi-Z is first, it is possible that the current may discharge to zero before the FET turns on, so the final current is set only by the FET "on time". If the Hi-Z is last, then the final current may be zero. This information is signaled to the estimator circuit by the modulator, which may set the lo_level_d to 1 if this cycle started with FETs on.

First, the change in current due to the FETs may be computed:

$$I_M = -I_L(n-1)*[(R_L+DCR)/L*T_S*D_{LO}(n)+(R_H+DCR)/L*T_S*D_S(n)]+V_{IN}/L*T_S*D_S(n)-V_{IND}/L*T_S*(D_{LO}(n)+D_S(n)) \quad (12)$$

The possible high diode contribution during the HiZ time is:

$$I_{JH0} = [-I_L(n-1)*(R_{JH}+DCR)/L*T_S+(V_{IN}+V_J-V_{IND})/L*T_S]*(1-D_S(n)-D_{LO}(n)) \quad (13)$$

and the low diode:

$$I_{JH0} = [-I_L(n-1)*[(R_{JL}+DCR)/L*T_S]-(V_J+V_{IND})/L*T_S]*(1-D_S(n)-D_{LO}(n)) \quad (14)$$

If lo_level_d is 1 (start with FET on, possibly end in Hi-Z) the diode discharge is applied to the current after the effect of the FETs:

---

If $I_L(n-1)+I_M < -I_{JH0}$
   $I_L(n) = I_L(n-1)+I_M+I_{JH0}$
else if $I_L(n-1)+I_{LM} > -I_{LJL0}$
   $I_L(n) = I_L(n-1)+I_M+I_{JL0}$
else if $(1-D_S(n)-D_{LO}(n)) == 0$    (no hi-Z time, so no diode effect)
   $I_L(n) = I_L(n-1)+I_M$
else             (there is Hi-Z time and currents nearly zero)
   $I_L(n) = 0$

---

If lo_level_d is 0 (start in Hi-Z, end with FET on) the diode discharge is applied to the previous current, with the FET added to that:

---

If $I_L(n-1) < -I_{JH0}$
   $I_L(n) = I_L(n-1)+I_{JH0}+I_M$
else if $I_L(n-1) > -I_{LJL0}$
   $I_L(n) = I_L(n-1)+I_{JL0}+I_M$
else if $(1-D_S(n)-D_{LO}(n)) == 0$
   $I_L(n) = I_L(n-1)+I_M$
else
   $I_L(n) = I_M$

---

The system model includes several other transformations. First, Ds(n) may be replaced by duty_hi_ts, which is:

$$\text{duty\_hi\_ts}(n) = Thi(n)/Tsw = D_S(n)*Ts/Tsw \quad (17)$$

and

Dlo(n) by duty_lo_ts:

$$\text{duty\_lo\_ts}(n) = Tlo(n)/Tsw = Dlo(n)*Ts/Tsw \quad (18)$$

Also, currents may be scaled by the ADC one-sided input range from amps to "full-scale" (FS):

$$J\text{sense\_fs} = I\text{sense}/Iadc\_\text{range} \quad (19)$$

The latest version may be set to no longer convert directly into hi-time duty ratio units, as that may complicate calculations of low-FET on-times in diode emulation mode, voltage ratio calculations of droop and IR drops, and dynamically changing Vin calculations. Conversions between changes in full-scale currents and on-times for high and low FETs may be computed based on the slopes, ignoring $I_L*R$ losses, scaling by Tsw/Ts to allow use of duty_x_ts:

$$X\text{duty2ifs} = V_{IN}*(T_{SW}/L/Iadc\_\text{range}) \quad (20a)$$

$$X\text{dutylo2ifs} = V_{IND}*(T_{SW}/L/Iadc\_\text{range}) \quad (20b)$$

The inverses may be used by the predictive current circuit to compute pulse-widths $$X\text{ifs2duty} = (1/V_{IN})*(Iadc\_\text{range}*L/T_{SW}) \quad (21)$$

$$X\text{ifs2dutylo} = (1/V_{IND})*(Iadc\_\text{range}*L/T_{SW}) \quad (22)$$

Although for the low-FET on-time computations in diode-emulation mode, $1/V_{REF}$ may be used instead of $1/V_{IND}$ to avoid a division calculation on a rapidly varying voltage. This is justified since diode-emulation is used at relatively low currents, so there is small droop or drops on the board. A term may also be introduced for current change from the diode drops, assuming the two diodes are similar:

$$X\text{dutyj2ifs} = V_J*(T_{SW}/L/Iadc\_\text{range}) \quad (23a)$$

The $I_L*R$ drops in the inductor current calculation are quite small, and the variations in the resistance depending upon which device is on make little difference. As a result, it is possible to use an average value that is reasonably close for normal operation. This value is used in this constant, which gives the per-cycle proportional current loss (scaled per sample time Ts):

$$K\text{estave} = Rave*T_S/L \quad (23b)$$

Given all of these changes, the computation of the new scaled current J(n) (where $J=I_L/Iadc\_\text{range}$) from the previous value J(n−1), the FET on-time fractions duty_hi_ts, duty_lo_ts, etc. may all be formulated:

$$Jloss = J(n-1)*Kestave \quad (24)$$

$$Jm = Xduty2ifs*\text{duty\_hi\_ts} - Xdutylo2ifs*(\text{duty\_lo\_ts}+\text{duty\_hi\_ts}) \quad (24a)$$

$$Jjh = (Xduty2ifs + Xdutyj2ifs - Xdutylo2ifs)* \quad (25)$$
$$(Ts/Tsw - \text{duty\_lo\_ts} - \text{duty\_hi\_ts})$$

$$Jjl = \quad (26)$$
$$-(Xdutylo2ifs + Xdutyj2ifs)*(Ts/Tsw - \text{duty\_lo\_ts} - \text{duty\_hi\_ts})$$

$$J1 = J(n-1) - Jloss + Jm \quad \text{if lo\_level} == 1, \text{else:} \quad (27)$$
$$= J(n-1) - Jloss$$

$$J2 = J1 + Jjh \quad \text{if } J1 < -Jjh, \text{else} \quad (28)$$
$$= J1 + Jjl \quad \text{if } J1 > -Jjl, \text{else}$$
$$= J1 \quad \text{if } D_S(n) + D_{LO}(n) == 1, \text{else}$$
$$= 0$$

$$J(n) = J2 \quad \text{if lo\_level} == 1, \text{else} \quad (29)$$
$$= J2 + Jm$$

One possible simplification is to implement the multiplications in the diode current computations (equations 25 and 26) with one-bit multiplications by 1, if duty_lo_ts+duty_high_ts is 0. This may introduce errors, which, however, are not significant if the FET off-time is long enough to fully discharge the inductors.

Voltage Ratio and Steady-state Duty Estimation

The steady-state duty ratio needed to maintain the desired voltage transfer ratio as a function of plant parameters and load current may be computed. In the schematic shown in FIG. 22, it can be observed that the board and socket parasitic resistances (lumped as Rb) as well as the switch and inductor resistances may be included for the sake of better accuracy. In the system, Vin and Vout may be measured, while Vind may be estimated. The inductor currents IL may also be measured or estimated. In steady state there is no displacement current in the filter capacitor, except for the ripple current which is neglected by considering only the average across a switching cycle Tsw. The analog system may compute the error voltage by subtracting the measured output voltage from the reference voltage minus the droop voltage:

$$V_{ERROR} = V_{REF} - R_{DROOP} * \text{sum}(I_L) - V_{OUT} \quad (30)$$

To compute the voltage ratio, the output voltage may be reconstructed using the estimated inductor currents:

$$V_{OUT\_EST} = V_{REF} - R_{DROOP} * Iadc\_range * \text{sum}(J_{EST}) - V_{ERROR} \quad (31)$$

(It should be noted that the signal in the model Verror is $V_{ERROR}/adc\_range$.)

The duty ratio of the PWM is set to achieve the voltage $V_{IND}$ at the inductor bus, which drops to $V_{OUT}$ after the board resistance. This voltage may be computed as:

$$V_{IND} = V_{OUT} + I_{LOAD} * R_B. \quad (32)$$

At steady-state, $I_{LOAD} = \text{sum}(I_L)$, so:

$$V_{IND} = V_{OUT\_EST} + R_B * Iadc\_range * \text{sum}(J_{EST}) \quad (33)$$

In the system, the voltage drop across $R_B$ is comparable to Rdroop, from which the transfer ratio may be computed:

$$Vratio = V_{IND}/V_{IN} \quad (34)$$

In steady-state, the inductor current returns the same level each cycle, so this relationship may be solved by the on-time per cycle (Tss):

$$Son * Tss = Soff * (Tsw - Tss) \quad (35)$$

(where Soff is the positive magnitude of the down slope).

$$Tss = Soff/(Son+Soff) * Tsw \quad (36)$$

The steady-state duty ratio Dss is $$Dss = Tss/Tsw = Soff/(Son+Soff) \quad (37)$$

Substituting equations (3) and (4) above, but using the cycle- and phase-averaged current $I_{LO}$:

$$Dss = [(V_{IND}+I_{LO}*(R_L+DCR))/L]/[(V_{IN}-V_{IND}-I_{LO}*(R_H+DCR))/L + (V_{IND}+I_{LO}*(R_L+DCR))/L]$$

$$Dss = [V_{IND}+I_{LO}*(R_L+DCR)]/[V_{IN}-V_{IND}-I_{LO}*(R_H+DCR)+V_{IND}+I_{LO}*(R_L+DCR)]$$

$$Dss = [V_{IND}+I_{LO}*(R_L+DCR)]/[V_{IN}+I_{LO}*(R_L-R_H)] \quad (38)$$

Approximating $1/(1+I_{LO}*(R_L-R_H)/V_{IN})$ by $(1-I_{LO}*(R_L-R_H)/V_{IN})$:

$$Dss \sim = [V_{IND}+I_{LO}*(R_L+DCR)]/V_{IN}*(1-I_{LO}*(R_L-R_H)/V_{IN}) \quad (39)$$

and then expanding:

$$Dss \sim = V_{IND}/V_{IN}+I_{LO}*(R_L+DCR)/V_{IN}-V_{IND}/V_{IN}*I_{LO}*(R_L-R_H)/V_{IN} \quad (40)$$

Eliminating the product of two relatively small I*R drops:

$$Dss \sim = V_{IND}/V_{IN}*(1-I_{LO}*(R_L-R_H)/V_{IN})+I_{LO}*(R_L+DCR)/V_{IN} \quad (41)$$

The circuit uses the cycle- and phase-averaged full-scaled current Javer computed from J(n). Introducing the constants:

$$Kest2 = Iadc\_range*(R_L+DCR) \quad (42)$$

$$Kest1 = Iadc\_range*(R_L-R_H) \quad (43)$$

Vduty may then be computed as:

$$Vduty = V_{IND}*(1/V_{IN})*(1-Kest1*Javer*(1/V_{IN}))+Kest2*Javer*(1/V_{IN}) \quad (44)$$

taking advantage of a pre-computed inverse of $V_{IN}$.

Predictive Current Pulse-width Computation

The normal modulator timing is similar to the APP modulator for small error signal changes. The pulse may be nominally positioned at the end of the switching cycle. The pulse start time (leading edge) may be computed by subtracting the desired width from the remaining time in the cycle—when there is just enough time left for the pulse before it starts. If the desired pulse-width changes during the pulse, the ending time (trailing edge) is adjusted if possible. If the commanded pulse-width decreases sharply, below the time the pulse has already been on, then the pulse may be terminated immediately. Modulating both edges allows rapid transient response.

Figure 32:
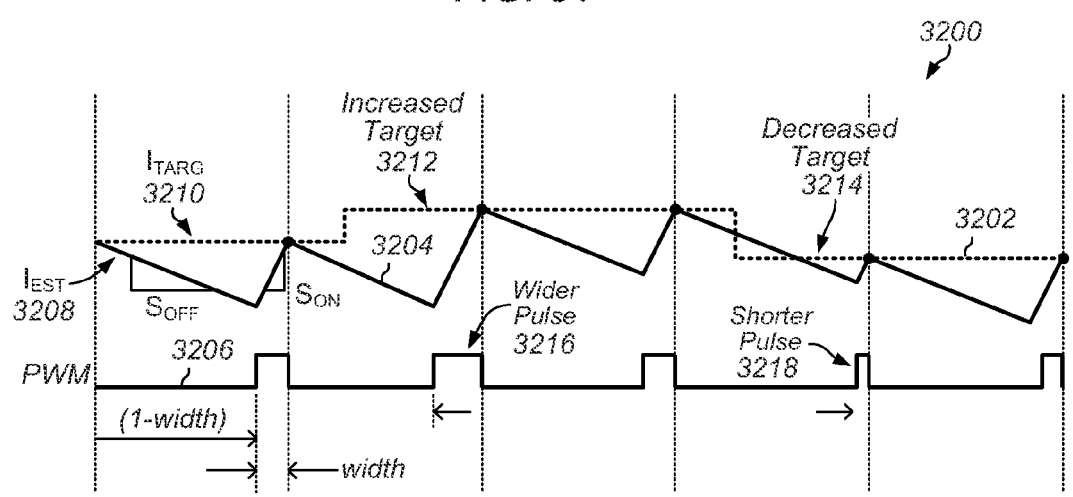
FIG. 32 shows a waveform diagram illustrating the behavior of the inductor current and corresponding drive signal according to a first control sequence.

The pulse-width may be computed based on how much on-time is needed to get the phase's current to meet the target current. The target current is set by the voltage error path, and represents the (value of the) current that the phase should reach at the end of its present switching cycle. Since the normal start time is just the on-time before the cycle end, the pulse is to end at the end of the cycle, as the current has just reached the target. If the target current changes during the pulse, then the width of the pulse is adjusted to intercept the predicted current discharge slope ($S_{OFF}$) line passing through the target current at the cycle end. With a decrease in the target, the pulse ends earlier, so that after discharging for the remaining time, the current will hit the target. This sequence 3200 is illustrated in FIG. 32. The pulse-width of the PWM control signal 3206 is adjusted to obtain a wider pulse 3216 or shorter pulse 3218 as desired, to reach an increased target value 3212 or decreased target value 3214, respectively, of target current 3202, when starting from a target value of 3210. Current waveform 3204 may also be representative of an estimated current 3208, in case the inductor current is not measured but inferred instead, as previously mentioned.

Figure 33:
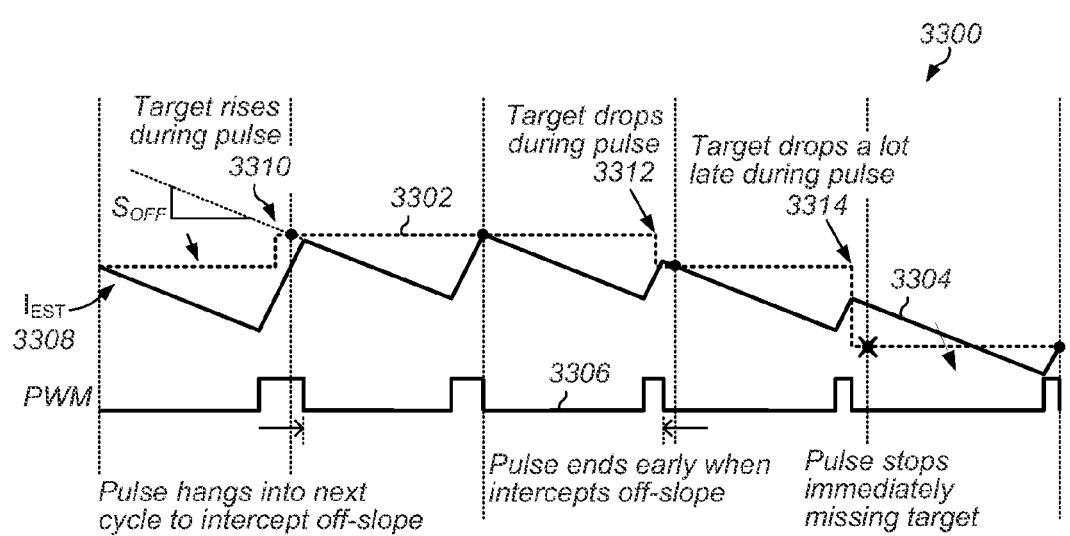
FIG. 33 shows a waveform diagram illustrating the behavior of the inductor current and corresponding drive signal according to a second control sequence.

A different sequence 3300 is illustrated in FIG. 33. If the target current 3302 increases during the pulse (3310), the target might not be reached by the end of the cycle. This may be due to the starting time having been chosen to be late enough to just hit the old target. In this case, the pulse of control signal 3306 continues into the next cycle until the current intercepts the line that would be formed by extrapolating the discharge slope back up to the target current at the end of the original cycle. Thus, the current waveform for the rest of the second cycle may be the same as if the current had hit the target. When the target decreases during the pulse (3312), it may end early, when the current intercepts the predicted off-slope. If the target decreases sharply late in the pulse (3314), the target might not be reached as the current 3304 has already gone too high, so the pulse stops immediately. Again, current 3304 may be representative of an estimated current 3308, in case the inductor current is not measured but inferred instead.

Figure 34:
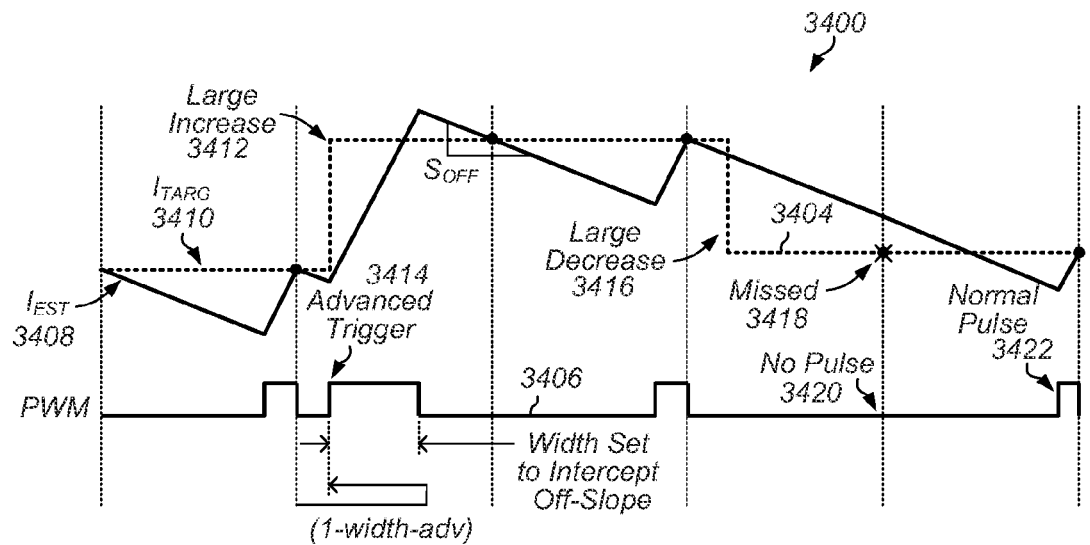
FIG. 34 shows a waveform diagram illustrating the behavior of the inductor current and corresponding drive signal according to a third control sequence.

A third sequence 3400 is illustrated in FIG. 34. When a large error step causes the target current value 3410 to increase significantly (3412), the pulse trigger circuit may advance the starting time of the pulse of control signal 3406 (3414). In this case, the pulse-width may be set to have the predicted off-slope intercept the target at the cycle end. The system may not be able to follow large decreases in the target current (3416), causing the pulse to be skipped in that cycle if the calculated pulse-width is negative or below the programmed minimum width (3418 resulting from 3420). Normal operation resumes as soon as the target current is achievable (3422). Again, the current may be representative of an estimated current 3408, in case the inductor current is not measured but inferred instead.

Figure 35:
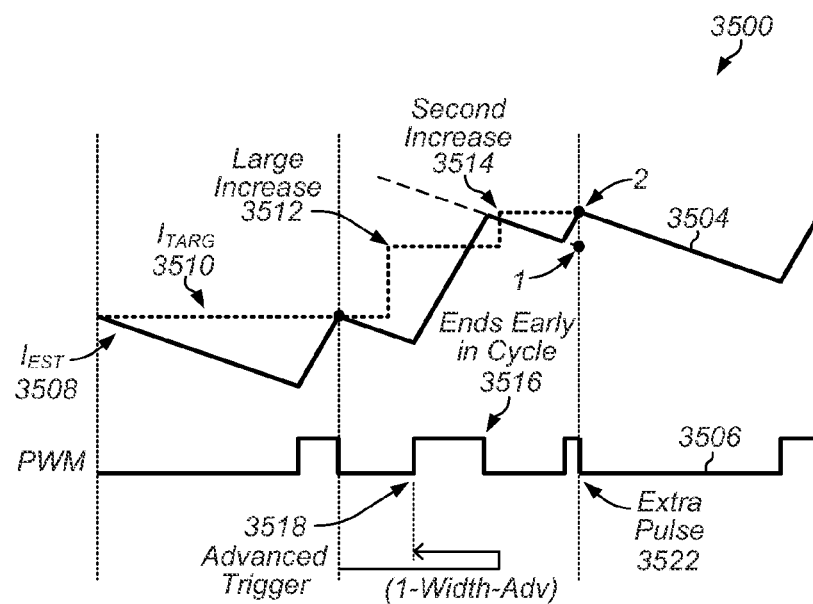
FIG. 35 shows a waveform diagram illustrating the behavior of the inductor current and corresponding drive signal according to a fourth control sequence.

Another possible sequence 3500 is illustrated in FIG. 35. It is possible that following a large increase 3512 of the target current value 3510, a second increase 3514 in the target current value 3510 may occur during a cycle. In this case, if the first pulse (advanced trigger 3518) of control signal 3506 ended sufficiently early (3516), then an extra pulse 3522 may be allowed. The extra pulse-width may be set to exceed some minimum larger-than-normal minimum pulse-width. Also, the recent pulse rate for that phase may be specified to be below a programmed limit to make it possible to obtain an extra pulse. Again, current 3504 may be representative of an estimated current 3508, in case the inductor current is not measured but inferred instead.

Since the pulse being computed may begin at any time t in the cycle, the calculations may be started from the present instantaneous phase current, I(t). When the phase driver is turned on, the inductor current may increase at a rate of $S_{ON}$, and when the phase driver is turned off, the inductor current may decrease at $S_{OFF}$. These slew rates may be used by the current estimator and voltage ratio circuit.

Computing the on time to move from I(t) to $I_{TARG}$ at $T_{END}$ involves solving the following equation:

$$I(t)+S_{ON}*T_{ON}=I_{TARG}-S_{OFF}*(T_{END}-(t+T_{ON}))$$

Solving for $T_{on}$:

$$T_{ON}=(I_{TARG}-I(t))*L/V_{IN}+V_{OUT}/V_{IN}*(T_{END}-t)$$

When and if this computed correction pulse is started, it may be controlled separately by the pulse trigger circuit. In fact, it may be possible that the trigger has already started a pulse in a previous sample time and the driver is already on, and if so, how much longer the pulse is continued is determined by the computation. The total pulse-width may change during the pulse if the target current changes. This provides considerable flexibility in timing pulses, allowing for fast response to changing load conditions. For instance, if $I_{TARG}$ changes significantly, additional pulses might be added with their pulse-width computed based on the change.

Another characteristic of this computation method is that it does not assume that the previous cycle was steady state. The previous pulse may have occurred at any point, and the present phase current might not correspond to the average current for the previous cycle. This enables accurate corrections during changing conditions. In multiphase systems, each phase may be targeting the same new current, and thus any existing imbalances between the phases tend to be removed. When the target current is rapidly changing, and different phase drive pulses occur at different times, there will be some differences among the phases. But, these differences are corrected at the next chance. It is possible that the pulse trigger circuit might add additional pulses if large differences between its present current value and the most recent target value are detected. In that case, the calculated correction pulse-width is computed properly.

In the embodiments described above, it assumed that the current slews as expected. If one phase has component values different from the others, its slewing rate may be different, and the change in current may be different than desired. The circuit may attempt to fix the error in the following pulse, but it may continue to produce new errors. Another form of error detection may be implemented to obtain the desired phase balancing. Examples of such error detection include imbalance error integrators, or possibly circuit parameter estimators.

Targeting the pulse to leave the phase current on a trajectory compatible with steady-state operation at the base switching frequency (with phase shifts for multiphase) means that the system stays very close to operating as a fixed-frequency regulator, even though the pulse frequency might be different. The system may thus be expected to return to fixed-frequency operation on the same timing as quickly as the load transients permit.

The accuracy and timeliness of the measurement of the present phase current is of high importance. Any lags or other errors may result in incorrect pulse-widths and may affect loop stability. This limitation may be addressed by combining the pulse-width calculation method described above with a synthetic current estimation loop, in which lag errors may be eliminated.

Figure 36:
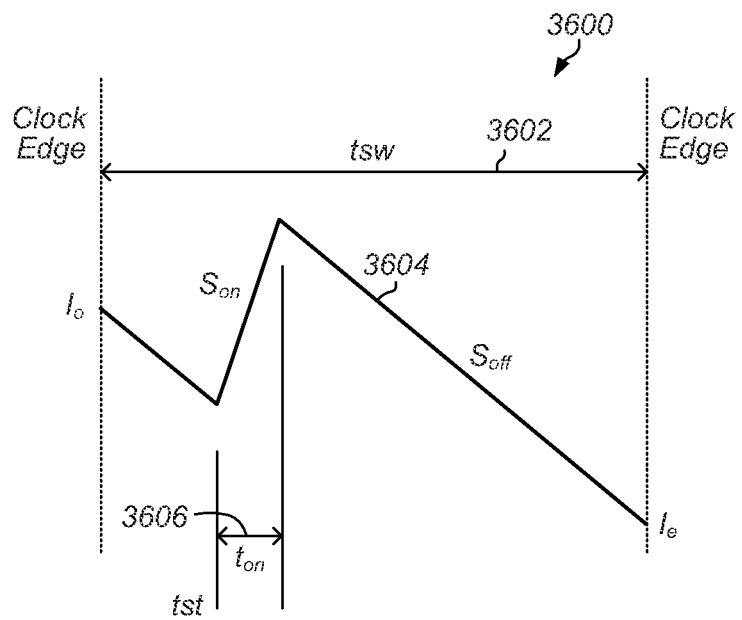
FIG. 36 shows a waveform illustrating the inductor current when there is one "on time" between clock cycles.

In general, if there is one "on time" between clock cycles, the current waveform appears as illustrated in FIG. 36 by current waveform 3604 in diagram 3600. The average current may be derived by the trapezoidal rule:

$$I_{avg} = I_o - \frac{S_{off} + S_{on}}{2}d^2 tsw + (S_{off} + S_{on})d \cdot tsw - \frac{S_{off}}{2}tsw - (S_{off} + S_{on})d \cdot tst \quad \text{Eq. Y1}$$

where d is the duty-cycle, $t_{on}/tsw$ (where $t_{on}$ is indicated by 3606, and tsw is indicated by 3602 in FIG. 36).

The clock edge currents are independent of tst and are related. Equation Y1 may thus be rewritten as:

$$I_{avg} = I_e - \frac{S_{off} + S_{on}}{2}d^2 tsw + \frac{S_{off}}{2}tsw - (S_{off} + S_{on})d \cdot tst \quad \text{Eq. Y2}$$

Considering steady state, $I_o=I_e$. The previously derived steady state duty-cycle (dss) may be substituted in equation Y2, yielding:

$$I_{avg} = I_e + \frac{S_{off}}{2}(1 - dss)tsw - S_{off} \cdot tst$$

or $$I_{avg} = I_e + \frac{S_{on}}{2}dss \cdot tsw - S_{off} \cdot tst$$

This equation is true if the current is in steady state, i.e. $I_o=I_e$.

Figure 37:
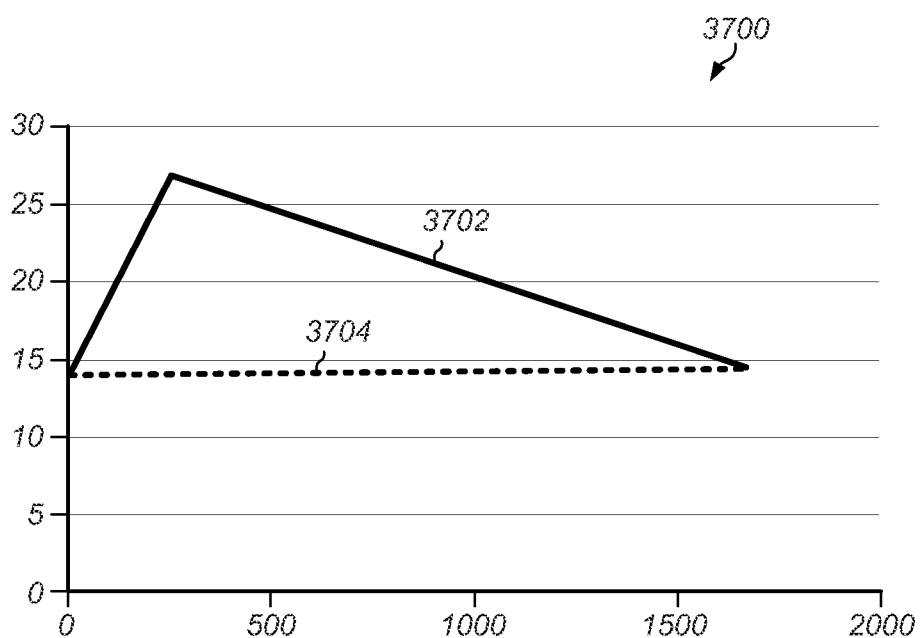
FIG. 37 shows a waveform diagram illustrating a simulated current profile with a sample-by-sample prediction.

Using a different approach, small duty-cycle deviations from steady state, i.e. dss+dd may be assumed as opposed to assuming steady state. It should be noted that various equations derived to predict the current one switch cycle ahead might not predict the current one sample ahead. That is, those equations may not correctly predict the current one sample ahead. FIG. 37 shows a simulated current profile 3700 with the sample-by-sample prediction. As shown in FIG. 37, the prediction 3704 matches the actual current 3702 at the end of the switching period. Predicting the current, $I_L$, one sample ahead may be performed using the present value of current and adding the product of the slope (on or off) and the sampling time: $i_L(k)=i_L(k-1)\pm S_x t_s$.

PWM Pulse Shaper

All numeric values provided below are for purposes of illustration, and to establish various relationships between different parameters and/or entities where applicable. One of ordinary skill in the art will appreciate that alternate embodiments may be implemented with different values as desired. In one set of embodiments, a pulse shaper may generate an output pulse with rise and fall edges located with time resolutions that are a small fraction of the clock period. A pulse shaper block may receive control signals at the sampling frequency Fs (=1/Ts, where Ts is the sample period) which indicate the new pulse level and the fractional Ts delay until that change is to take place. The output signal may change states at most once per sample period. In addition to the variable delay of 0 to (nearly) Ts, there may be a small constant propagation delay. The propagation delay may be kept under Ts, with smaller delay preferred. Typically, Fs may be determined by adc_osr*Fsw, for example, 32*2 MHz=64 MHz. The fine delay may given with dpwmFracBits bits, which is the overall dpwm_nbits minus log 2 (adc_osr) (for example, 12-5, leaving 7 bits of fine delay). In various embodiments, part of the fine delay may be counted down using a 2^N*Fs clock.

The application minimum pulse-width (high time) may be at least 30 ns, with minimum pulse spacings (low time) at least 300 ns (which might also be specified to be shorter if not repeated several pulses in a row). The circuitry supplying the level and delay may be used to enforce these limitations, while the pulse shaper may be operated to implement them. At lower sample rates, Ts may be longer than 30 ns so the starting time of a minimum width pulse is delayed to extend into the next sampling time. Thus, in the first sample, the shaper circuit may observe a 0-to-1 level change with a long delay (Ts minus 30 ns), followed by a 1-to-0 level change in the next sample with zero delay.

The shaper may be designed to be capable of generating output signals with short pulse spaces similar to the short pulse-widths, with one transition per sample. The fine delay value may only be meaningful on samples when the level has changed states. In successive samples in which the level remains static, the delay value may be ignored, with the output remaining at the indicated level. Various embodiments of a pulse shaper circuit in accordance with the principles described above may include the following inputs and outputs:

Inputs:
        level—the new level for the output signal (1 or 0) set after the delay
        delay[dpwmfracbits-1:0]—the fine delay in units of Ts/2^(dpwmFracBits). Valid on samples where the level has changed states.
        clkfs—the sample-rate (Fs) clock for input data
    Outputs:
        pwm_out.

Summary of Equations for Fixed-Fsw Loop (Baseline Implementation with Fixed Switching Frequency)

The following equations provide a baseline implementation of one embodiment of a fixed switching frequency controller according to the principles described above.

comPID
comp output is high-FET on-time fraction of Tsw.
    vRatioCalc
Inputs:
jEstSum—total current Amps/IadcRange
vError—voltage error in Volts/VadcRange
vRef—reference voltage in Volts/VrefDacRange
vIn—Supply voltage in Volts/VinRange
krDroopBrd—resistance in Ohms*IadcRange=IadcRange*(Rdroop-Rboard)
Normalized inductance value scaled to Volts*(Amps full-scale)/(switch period)
    kiDuty—Multiplied by 1/Vin to compute xifs2duty
        kiDuty=(IadcRange/Tsw)*L_nom
    kiDutyInv—(Tsw/IadcRange)/L_nom—Multiplied by Vin to compute xduty2ifs
        kiDutyInv=(Tsw/IadcRange)/L_nom
vDio—body diode forward voltage drop in volts Outputs
Inductor bus voltage, in volts
    vInd=vRef*vrefDacRange—jEstSsum*krDroopBrd—vError*VadcRange
Inverse reference voltage, in 1/Volts
    vRefInv=1/(vRef*VrefDacRange)
Inverse input supply voltage, in 1/Volts
    vInInv=1/(vIn*VinRange)
Voltage transfer ratio in volts/volts
    vRatio=vInd*(vInInv)
Normalized inverse up-slope—scale factor from current change (as fraction of full-scale) to duty fraction (on-time/switch period), in units of (delta duty ratio over one cycle)/(delta Amps/IadcRange over one cycle)
    xifs2duty=vInInv*kiDuty
Normalized up-slope—(delta Amps/IadcRange over one cycle)/(delta duty ratio over once cycle)
    xduty2ifs=(vIn*VinRange)*kiDutyInv
Normalized inverse down-slope—scale factor from current change (as a fraction of full-scale) to low-FET duty fraction (low FET on-time/switch period), in units of (delta low-FET duty fraction over one cycle)/(delta Amps/IadcRange over one cycle)
    xifs2dutylo=vRefInv*kiDuty
Normalized down-slope—(delta low-FET duty fraction over one cycle)/(delta Amps/IadcRange)
    idutylo2ifs=vInd*kiDutyInv
Negative of current step in one sample time due to lower body diode conduction, in Amps/IadcRange per Ts
    jDioL=(1/OSR)*(xdutylo2ifs+vDio*kiDutyInv)
Negative of current step in one sample time due to upper body diode conduction, in Amps/IadcRange per Ts
    jDioH=(1/OSR)*(xdutylo2ifs−xduty2ifs−vDio*kiDutyInv)
    dutyTarg
Inputs
Average of instantaneous phase currents, in Amps full-scale (Amps/IadcRange)
    jEstAve=sum(jEst)/phCount
Average of instantaneous phase currents scaled to equivalent hi-FET duty fraction
    diEstAve=sum(diEst)/phCount
Compensator duty fraction demand, not including steady-state
    comp=PID(vError)+CFB(jEstSum)
Voltage transfer ratio
    vRatio=Vind/Vin
Current corrections to steady-state duty ratio
    kEst1=(Ron_ls_nom-Ron_hs_nom).*Tsw./L_nom
    kEst2=(Ron_ls_nom+DCR_nom).*Tsw./L_nom
Limiter on target current, scaled as duty fraction
    diTargMax=(50/IadcRange)*(IadcRange*L_nom/Vg/Tsw)
Inverse of number of active phases
    nPhasesInv=1/phCount
Outputs
Hi-FET duty fraction for steady-state (hi-FET on-time/Tsw)
    vDuty=vRatio+kEst1*jEstAve*vRatio+kEst2*jEstAve
Internal unlimited target current, as duty fraction (hi-FET on-time/Tsw)
    diTargPre=diEstAve+vDuty/2+comp*nPhasesInv
Limited target current, as duty fraction (hi-FET on-time/Tsw)
    diTarg=min(diTargMax, diTargPre)
Current limit indicator
    iLimit=(diTargPre>=diTargMax)
    currEst Inputs
Correction to estimated current, in Amps full-scale
  jEstErr (see currEstErr)
High-FET on-time during this sample time, as fraction of Tsw
  dutyHiTs=(high-FET on time during Ts)/Tsw
Low-FET on-time during this sample time, as fraction of Tsw.
  dutyLoTs=(low-FET on time during Ts)/Tsw
Indicator whether low-FET was on at all during previous sample time. If 0, then the PWM starts at hi-Z and may switch hi/lo FET on later. Diodes start out on first and may discharge the current to zero before FET turns on. If loEnLevelReg is 1, then FETs are on first, so FET current added first then diode discharge current added. The problem case is when the current is small enough for diodes to hit zero current, which may occur either before FETs turn back on, or after they have turned off.
  loEnLevelReg—1 if low-FET was on at all during previous sample clock.
Resistive loss in inductor and switch, Amps loss per sample time per Amps flowing
  kEstAve=(Ron_ls*0.85*Ron_hs*0.15+DCR).*Ts./ L_nom.*1.385
Internal Calculations
Mosfet current change contribution, delta Amps full-scale during one Ts
  jm=dutyHiTs*xduty2ifs−(dutyHiTs+dutyLoTs) *xdutylo2ifs
Negative of low-side diode current change, delta Amps full-scale during one Ts

```
if (dutyHiTs+dutyLoTs)<=0 [ no Mosfet on time ]
    minus_jjl = jDioL
else
    minus_jjl = 0
```

Negative of high-side diode current change, delta Amps full-scale during one Ts

```
if (dutyHiTs+dutyLoTs)<=0 [ no Mosfet on time ]
    minus_jjh = jDioH
else
    minus_jjh = 0
```

First partial update of estimated current, in Amps full-scale

```
if (loEnLevelReg==1) [ mosfets on first ]
    j1 = jEstFB(previous cycle) − jEstFB*kEstAve + jm
else
    j1 = jEstFB(previous cycle) − jEstFB*kEstAve
```

Second part of update, with diode current effect

```
if (j1−minus_jjh)<0 [ high diode conducts, but current does not reach 0 ]
    j2 = j1 − minus_jjh
elseif (j1−minus_jjl)>=0 [ low diode conducts, but current does not reach 0 ]
    j2 = j1 − minus_jjl
elseif (1/OSR − dutyHiTs − dutyLoTs)<=0 [ FETs on whole cycle, no diodes ]
    j2 = j1
else
    j2 = 0
```

Third part of update, apply Mosfet after diode

```
if ( loEnLevelReg == 1) [ Mosfets on first, then diodes ]
    j3 = j2
else                    [ add mosfet current after diode change ]
    j3 = j2 + jm
```

Estimated current, in Amps full-scale

```
if (preset)
    jnext = 0
else
    jnext = j3 + jEstErr
```

Outputs:
Estimated current, in Amps full-scale, always active for error feedback
  $jEstFB = jnext*z^{-1}$
Estimated current, in Amps full-scale

```
if (useSenseCurr==1)
    jEst = jSense
else
    jEst = jEstFB
```

Estimated current scaled to equivalent high-FET on-time fraction of Tsw
  diEst=jEst*xifs2duty
Estimated current scaled to equivalent low-FET on-time fraction of Tsw
  diLoEst=jEst*xifs2dutyLo
icorr
Current correction high-FET on-time duty fraction of Tsw
  iDuty=diTarg−diEst
pulseWidth
Flattened (no ripple) current adjustment term for pulse start advance
  iDutyFlat=iDuty−(1−tEndx−1/OSR)*vDuty
Pulse-width (high-Fet remaining on-time as fraction of Tsw)
  width=iDutyFlat+vDuty−vDuty*(tEndx+1/OSR−min (0.25, tEndx+1/OSR))
Another way of expressing the width, indicating that the predictive part for advanced pulses is limited to just 0.25. Most of the steady-state contribution actually comes from the ripple present in iDuty.
  width=iDuty+vDuty*min(0.25, tEndx+1/OSR)
Revised Equations for Ts Based Variable Fsw Loop
  Design Parameters
  DpwmFracBits—number of fractional-Ts bits for pulse timing.
  DpwmIntBits—number of integral-Ts bits for pulse timing calculations (not including sign).
    compPID
comp output is hi-FET on-time multiple of Ts
Old value is multiplied by swPer.
    vRatioCalc
Inputs
  jEstSum—total current Amps/IadcRange
  vError—voltage error in Volts/VadcRange
  vRef—reference voltage in Volts/VrefDacRange
  vIn—Supply voltage in Volts/VinRange
Effective resistive drop between Vref and Vind, resistance in Ohms*IadcRange
  krDroopBrd=IadcRange*(Rdroop-Rboard)

Normalized inductance value scaled to Volts*(Amps full-scale)/(sample period), multiplied by 1/Vin to compute xifs2duty.
  kiDuty=(IadcRange/Ts)*L_nom
Inverse inductance, multiplied by Vin to compute xduty2ifs
  kiDutyInv=(Ts/IadcRange)/L_nom
vDio—body diode forward voltage drop in volts
Outputs
Inductor bus voltage, in volts
  vInd=vRef*vrefDacRange−jEstSum*krDroopBrd−vError*VadcRange
Inverse reference voltage, in 1/Volts
  vRefInv=1/(vRef*VrefDacRange)
Inverse input supply voltage, in 1/Volts
  vInInv=1/(vIn*VinRange)
Voltage transfer ratio in volts/volts
  vRatio=vInd*(vInInv)
Normalized inverse up-slope—scale factor from current change (as fraction of full-scale) to per-sample duty fraction (on-time/sample period), in units of (delta duty ratio over one cycle)/(delta Amps/IadcRange over one sample)
  xifs2duty=vInInv*kiDuty
Normalized up-slope—(delta Amps/IadcRange over one sample)/(delta duty ratio over one sample)
  xduty2ifs=(vIn*VinRange)*kiDutyInv
Normalized inverse down-slope—scale factor from current change (as a fraction of full-scale) to low-FET duty fraction of sample (low FET on-time/sample period), in units of (delta low-FET duty fraction over one sample)/(delta Amps/IadcRange over one sample)
  xifs2dutylo=vRefInv*kiDuty
Normalized down-slope—(delta low-FET duty fraction over one sample)/(delta Amps/IadcRange)
  idutylo2ifs=vInd*kiDutyInv
Negative of current step in one sample time due to lower body diode conduction, in Amps/IadcRange per Ts
  jDioL=(1/OSR)* (xdutylo2ifs+vDio*kiDutyInv)
Negative of current step in one sample time due to upper body diode conduction, in Amps/IadcRange per Ts
  jDioH=(1/OSR)* (xdutylo2ifs−xduty2ifs−vDio*kiDutyInv)
  dutyTarg
Inputs
Average of instantaneous phase currents, in Amps full-scale (Amps/IadcRange)
  jEstAve=sum(jEst)/phCount
Average of instantaneous phase currents scaled to equivalent hi-FET duty fraction of Ts
  diEstAve=sum(diEst)/phCount
Compensator duty fraction demand, not including steady-state
  comp=PID(vError)+CFB(jEstSum)
Voltage transfer ratio
  vRatio=Vind/Vin
Current corrections to steady-state duty ratio
  kEst1=(Ron_ls_nom−Ron_hs_nom).*Ts./L_nom
  kEst2=(Ron_ls_nom+DCR _nom).*Ts./L_nom
Limiter on target current, scaled as duty fraction of Ts
  diTargMax=(50/IadcRange)*(IadcRange*L_nom/Vg/Ts)
Inverse of number of active phases
  nPhasesInv=1/phCount
Outputs
Hi-FET duty fraction of Ts for steady-state (hi-FET on-time/Ts)
  vDuty=vRatio+kEst1*jEstAve*vRatio+kEst2*jEstAve
Internal unlimited target current, as duty fraction of Ts (hi-FET on-time/Ts)
  diTargPre=diEstAve+vDuty/2+comp*nPhasesInv
Limited target current, as duty fraction of Ts (hi-FET on-time/Ts)
  diTarg=min(diTargMax, diTargPre)
Current limit indicator
  iLimit=(diTargPre>=diTargMax)
  currEst
Inputs
Correction to estimated current, in Amps full-scale
  jEstErr (see currEstErr)
High-FET on-time during this sample time, as fraction of Ts
  dutyHiTs=(high-FET on time during Ts)/Ts
Low-FET on-time during this sample time, as fraction of Ts.
  dutyLoTs=(low-FET on time during Ts)/Ts
Indicator whether low-FET was on at all during previous sample time. If 0, then the PWM starts at hi-Z and may switch hi/lo FET on later. Diodes start out on first and may discharge the current to zero before FET turns on. If loEnLevelReg is 1, then FETs are on first so FET current added first then diode discharge current added. The problem case is when the current is small enough for diodes to hit zero current, which may occur before FETs turn back on, or after they have turned off.
  loEnLevelReg—1 if low-FET was on at all during previous sample clock.
Resistive loss in inductor and switch, Amps loss per sample time per Amps flowing
  kEstAve=(Ron_ls*0.85+Ron_hs*0.15+DCR).*Ts./L_nom.*1.385
Internal Calculations
Mosfet current change contribution, delta Amps full-scale during one Ts
  jm=dutyHiTs*xduty2ifs−(dutyHiTs+dutyLoTs)*xdutylo2ifs
Negative of low-side diode current change, delta Amps full-scale during one Ts

```
if (dutyHiTs+dutyLoTs)<=0 [ no Mosfet on time ]
    minus_jjl = jDioL
else
    minus_jjl = 0
```

Negative of high-side diode current change, delta Amps full-scale during one Ts

```
if (dutyHiTs+dutyLoTs)<=0 [ no Mosfet on time ]
    minus_jjh = jDioH
else
    minus_jjh = 0
```

First partial update of estimated current, in Amps full-scale

```
if (loEnLevelReg==1) [ mosfets on first ]
    j1 = jEstFB(previous cycle) − jEstFB*kEstAve + jm
else
    j1 = jEstFB(previous cycle) − jEstFB*kEstAve
```

Second part of update, with diode current effect

```
if (j1−minus_jjh)<0 [ high diode conducts, but current does not reach 0 ]
    j2 = j1 − minus_jjh
elseif (j1−minus_jjl)>=0 [ low diode conducts, but current does not reach 0 ]
    j2 = j1 − minus_jjl
```

```
elseif (1/OSR − dutyHiTs − dutyLoTs)<=0 [ FETs on whole cycle,
no diodes ]
    j2 = j1
else
    j2 = 0
```

Third part of update, apply Mosfet after diode

```
        if ( loEnLevelReg ==1) [ Mosfets on first, then diodes ]
        j3 = j2
        else            [ add mosfet current after diode change ]
        j3 = j2 + jm
```

Estimated current, in Amps full-scale

```
                if (preset)
                    jnext = 0
                else
                    jnext = j3 + jEstErr
```

Outputs:
Estimated current, in Amps full-scale, always active for error feedback
  $jEstFB=jnext*z^{-1}$
Estimated current, in Amps full-scale

```
                if (useSenseCurr==1)
                    jEst = jSense
                else
                    jEst = jEstFB
```

Estimated current scaled to equivalent high-FET on-time fraction of Ts
  diEst=JEst*xifs2duty
Estimated current scaled to equivalent low-FET on-time fraction of Ts
  diLoEst=jEst*xifs2dutyLo
  iCorr
Current correction high-FET on-time duty fraction of Ts
  iDuty=diTarg−diEst
  pulseWidth
Time remaining in switching cycle, measured in sample periods with extension into next cycle during overhanging pulse.
  tEndx
Flattened (no ripple) current adjustment term for pulse start advance
  iDutyFlat=iDuty−(swPer−tEndx−1)*vDuty
Pulse-width (high-Fet remaining on-time as fraction of Ts)
  width=iDutyFlat+vDuty−vDuty*(tEndx+1 min(0.25*swPer,tEndx+1))
Another way of expressing the width, illustrating that the predictive part for advanced pulses is limited to just 0.25. Most of the steady-state contribution actually comes from the ripple present in iDuty.
  width=iDuty+vDuty*min(0.25*swPer,tEndx+1,/OSR)

Although the embodiments above have been described in considerable detail, numerous variations and modifications will become apparent to those skilled in the art once the above disclosure is fully appreciated. It is intended that the following claims be interpreted to embrace all such variations and modifications. As previously mentioned, the single-cycle predictive control method disclosed herein may be applied equally to various systems in which a control mechanism is employed to regulate a desired state variable, such as output state variables or other regulated state variables in the manner described herein.

We claim:

1. A method for ramping phase currents in a current share configuration, wherein the phase currents sum to a total current, the method comprising:
  providing, by each voltage regulator module of a plurality of voltage regulator modules, a respective phase current in the current share configuration;
  determining, for each respective phase current, a target current value according to a cycle-averaged present value of the respective phase current and a voltage error value of the voltage regulator module providing the respective phase current; and
  ramping each phase current to the target current value responsive to instructing the plurality of voltage regulator modules to ramp their respective member currents.

2. The method of claim 1, wherein said determining the target current value according to the voltage error comprises obtaining one or more of:
  a proportional control value according to the voltage error;
  an integral control value according to the voltage error; or
  a derivative control value according to the voltage error.

3. The method of claim 1, further comprising:
  generating, by each voltage regulator module, a common output voltage;
  wherein said generating the respective phase current is performed according to the common output voltage.

4. The method of claim 3, further comprising:
  generating, by each voltage regulator module, a respective control pulse;
  wherein said generating the common output voltage is performed responsive to the respective control pulse.

5. The method of claim 4, further comprising determining a width of the control pulse according to:
  the target current value at an end of a respective switching cycle; and
  a value of the respective phase current at a beginning of the respective switching cycle.

6. The method of claim 4, further comprising determining a start time of the control pulse, comprising computing a start time that results in delivering a specified amount of charge according to the target current value during the respective switching cycle.

7. The method of claim 6, wherein the specified amount of charge is commensurate with the target current value multiplied by a time period representative of the respective switching cycle.

8. A voltage regulator module comprising:
  an output stage configured to provide a common output voltage together with one or more additional voltage regulator modules, and further configured to provide a corresponding phase current, wherein the corresponding phase current represents a portion of a total current to be provided by a current share configuration established by a plurality of voltage regulator modules, each voltage regulator module of the plurality of voltage regulator modules configured to provide a respective phase current in the current share configuration; and
  a controller configured to:
    determine a target current value according to a cycle-averaged present value of the corresponding phase current and a voltage error value corresponding to the common output voltage; and cause the output stage to ramp the phase current to the target current value responsive to the plurality of voltage regulator modules being instructed to ramp their respective phase currents.

9. The voltage regulator module of claim 8, wherein the controller is further configured to determine the target current value according to one or more of:
   a proportional control value based on the voltage error;
   an integral control value based on the voltage error; or
   a derivative control value based on the voltage error.

10. The voltage regulator module of claim 8, wherein the controller is further configured to generate a control pulse; and
   wherein the output stage is configured to generate and provide the output voltage together with the one or more additional voltage regulator modules, responsive to the control pulse.

11. The voltage regulator module of claim 10, wherein the controller is further configured to determine a width of the control pulse according to:
   the target current value at an end of a respective switching cycle; and
   a value of the phase current at a beginning of the respective switching cycle.

12. The voltage regulator module of claim 10, wherein the controller is further configured to determine a start time of the control pulse that results in delivering a specified amount of charge according to the target current value during the respective switching cycle.

13. The voltage regulator module of claim 12, wherein the specified amount of charge is commensurate with the target current value multiplied by a time period representative of the respective switching cycle.

14. A predictive multi-phase controller comprising:
   an output configured to provide one or more control values usable to generate a control signal that controls an output stage of a voltage regulator module, wherein the voltage regulator module is usable as one of a plurality of voltage regulator modules configured to establish a current share configuration, wherein each voltage regulator module of the plurality of voltage regulator modules is usable to provide a respective phase current in the current share configuration; and
   circuitry configured to:
      determine a target current value according to a cycle-averaged present value of a first phase current, and a voltage error value corresponding to a common output voltage provided by the plurality of voltage regulator modules, wherein the first phase current is provided by the voltage regulator module; and
      ramp the first phase current to the target current value responsive to being instructed to ramp the first phase current, wherein to ramp the first phase current the controller is further configured to adjust one or more of the one or more control values.

15. The predictive multi-phase controller of claim 14, wherein the circuitry is further configured to determine the target current value according to one or more of:
   a proportional control value based on the voltage error;
   an integral control value based on the voltage error; or
   a derivative control value based on the voltage error.

16. The predictive multi-phase controller of claim 14, wherein the one or more control values comprise a pulse-width value of a control pulse; and
   wherein the control signal comprises the control pulse.

17. The predictive multi-phase controller of claim 16, wherein the circuitry is further configured to determine the pulse-width value according to:
   the target current value at an end of a respective switching cycle; and
   a value of the first phase current at a beginning of the respective switching cycle.

18. The predictive multi-phase controller of claim 14, wherein the one or more control values comprise a start time of a control pulse; and
   wherein the control signal comprises the control pulse.

19. The predictive multi-phase controller of claim 18, wherein the circuitry is further configured to determine the start time of the control pulse that results in delivering a specified amount of charge according to the target current value during a respective switching cycle.

20. The predictive multi-phase controller of claim 19, wherein the specified amount of charge is commensurate with the target current value multiplied by a time period representative of the respective switching cycle.

21. The predictive multi-phase controller of claim 14, wherein the circuitry is further configured to determine the target current value according to an estimated value of the first phase current at a beginning of a switching cycle.

* * * * *